US008532888B2

(12) United States Patent
Ishibashi et al.

(10) Patent No.: US 8,532,888 B2
(45) Date of Patent: Sep. 10, 2013

(54) CONTROL DEVICE FOR HYDRAULIC TRANSMISSION VEHICLE

(75) Inventors: Eiji Ishibashi, Komatsu (JP); Masayuki Mukaino, Komatsu (JP); Shigeru Yamamoto, Hirakata (JP); Yoshitaka Onodera, Hiratsuka (JP); Takao Ishihara, Hirakata (JP)

(73) Assignee: Komatsu Ltd., Tokyo (JP)

( * ) Notice: Subject to any disclaimer, the term of this patent is extended or adjusted under 35 U.S.C. 154(b) by 181 days.

(21) Appl. No.: 13/124,945

(22) PCT Filed: Sep. 28, 2009

(86) PCT No.: PCT/JP2009/066746
§ 371 (c)(1),
(2), (4) Date: Apr. 19, 2011

(87) PCT Pub. No.: WO2010/070962
PCT Pub. Date: Jun. 24, 2010

(65) Prior Publication Data
US 2011/0202243 A1 Aug. 18, 2011

(30) Foreign Application Priority Data
Dec. 17, 2008 (JP) ................................. 2008-320893

(51) Int. Cl.
*F16H 59/00* (2006.01)
*G06F 7/00* (2006.01)
*B60W 10/04* (2006.01)
*B60W 10/10* (2012.01)

(52) U.S. Cl.
USPC ................ 701/51; 701/54; 477/110; 477/111

(58) Field of Classification Search
USPC ................ 180/197, 242, 305, 306, 307, 446, 180/6.2, 6.34, 6.44, 6.48, 6.7; 37/15, 40; 417/34; 475/5, 72, 73; 477/1, 107, 110, 477/172, 175, 181, 39, 52, 68; 60/286, 325, 60/327, 329, 337, 395, 409, 421, 426, 428, 60/431, 443, 444, 445, 449, 451, 456, 468; 701/102, 103, 50, 51, 54, 55; 74/335, 730.1
See application file for complete search history.

(56) References Cited

U.S. PATENT DOCUMENTS
4,546,847 A * 10/1985 Abels ............................ 180/307
5,177,964 A * 1/1993 Tanaka et al. .................. 60/445
(Continued)

FOREIGN PATENT DOCUMENTS
JP          63-70311 A      3/1988
JP          2-3547 A        1/1990
(Continued)

OTHER PUBLICATIONS
Machine translation of WO 2007/049767 (Morinaga).*
(Continued)

*Primary Examiner* — Tuan C. To
*Assistant Examiner* — Kevin P Mahne
(74) *Attorney, Agent, or Firm* — Global IP Counselors, LLP

(57) ABSTRACT

A control device controls a hydrostatic transmission vehicle having a hydrostatic transmission with a variable displacement pump and a variable displacement hydraulic motor. The control device is configured to set a set vehicle speed based on a forward/rearward travel command and a gear stage command instructed by an operator, to set an upper limit of the engine speed with respect to the set vehicle speed for limiting the upper limit of the engine speed to a predetermined partial engine speed set to be lower than a high idle engine speed when the set vehicle speed is in a preliminarily set low and intermediate speed range, and to control respective displacements of the variable displacement pump and the variable displacement hydraulic motor based on the set vehicle speed for allowing a vehicle speed to reach the set vehicle speed even when the engine is rotated at the partial engine speed.

16 Claims, 15 Drawing Sheets

(56) References Cited

U.S. PATENT DOCUMENTS

| | | | |
|---|---|---|---|
| 5,297,649 A * | 3/1994 | Yamamoto et al. | 180/197 |
| 5,299,421 A * | 4/1994 | Ikari | 60/444 |
| 5,337,629 A | 8/1994 | Kita | 477/52 |
| 5,592,817 A * | 1/1997 | Nishimura et al. | 60/431 |
| 2004/0211614 A1* | 10/2004 | Matsuyama | 180/305 |
| 2005/0101436 A1* | 5/2005 | Funato et al. | 477/107 |
| 2006/0032221 A1* | 2/2006 | Fukasawa et al. | 60/431 |
| 2007/0062185 A1* | 3/2007 | Toji et al. | 60/444 |
| 2007/0111851 A1* | 5/2007 | Fukasawa et al. | 477/52 |
| 2007/0198158 A1* | 8/2007 | Ishibashi et al. | 701/50 |
| 2008/0128189 A1* | 6/2008 | Pruitt et al. | 180/197 |
| 2008/0214348 A1* | 9/2008 | Hasegawa et al. | 475/80 |
| 2008/0254935 A1* | 10/2008 | Kasuga et al. | 477/3 |
| 2008/0269011 A1* | 10/2008 | Sopko et al. | 477/34 |
| 2009/0000156 A1* | 1/2009 | Hartwick et al. | 37/348 |
| 2009/0029826 A1* | 1/2009 | Eguchi et al. | 477/39 |
| 2009/0077839 A1* | 3/2009 | Horii | 37/443 |
| 2009/0139792 A1* | 6/2009 | Chisholm et al. | 180/307 |
| 2009/0238696 A1* | 9/2009 | Satake et al. | 417/34 |
| 2009/0320461 A1* | 12/2009 | Morinaga et al. | 60/431 |
| 2010/0024412 A1* | 2/2010 | Hyodo et al. | 60/426 |
| 2010/0043419 A1* | 2/2010 | Nomura et al. | 60/328 |
| 2010/0083652 A1* | 4/2010 | Fukuda et al. | 60/487 |
| 2010/0089051 A1* | 4/2010 | Ohtsukasa | 60/451 |
| 2010/0106382 A1* | 4/2010 | Kodaka et al. | 701/54 |
| 2010/0138118 A1* | 6/2010 | Tsukada et al. | 701/50 |
| 2010/0167873 A1* | 7/2010 | Akiyama et al. | 477/68 |
| 2010/0186402 A1* | 7/2010 | Ariga et al. | 60/329 |
| 2010/0317486 A1* | 12/2010 | Hyodo et al. | 477/52 |

FOREIGN PATENT DOCUMENTS

| | | | |
|---|---|---|---|
| JP | 2-199367 A | | 8/1990 |
| JP | 4-271704 A | | 9/1992 |
| JP | 5-338474 A | | 12/1993 |
| JP | 2004-169569 A | | 6/2004 |
| JP | 2005-233420 A | | 9/2005 |
| JP | 2007-92908 A | | 4/2007 |
| JP | 2008-180275 A | | 8/2008 |
| JP | 2009168058 | * | 7/2009 |
| WO | WO 2007/049767 | * | 5/2007 |
| WO | WO 2008/081856 | * | 7/2008 |
| WO | WO 2008/123376 A1 | | 10/2008 |

OTHER PUBLICATIONS

JP2009168058—machine translation.*
International Search Report of corresponding PCT Application No. PCT/JP2009/066746.

* cited by examiner

|  | FORWARD TRAVEL OR NEUTRAL | REARWARD TRAVEL |
|---|---|---|
| LEFT FRONT-REAR DIFFERENTIAL PRESSURE $\Delta P_L$ | P54b - P54d | P54d - P54b |
| RIGHT FRONT-REAR DIFFERENTIAL PRESSURE $\Delta P_R$ | P54a - P54c | P54c - P54a |

Fig. 6

# CONTROL DEVICE FOR HYDRAULIC TRANSMISSION VEHICLE

CROSS-REFERENCE TO RELATED APPLICATIONS

This national phase application claims priority to Japanese Patent Application No. 2008-320893 filed on Dec. 17, 2008. The entire disclosure of Japanese Patent Application No. 2008-320893 is hereby incorporated herein by reference.

TECHNICAL FIELD

The present invention relates to a control device for a hydrostatic transmission vehicle, particularly to a control device for a hydrostatic transmission vehicle, typified by a bulldozer, which includes a variable displacement pump to be driven by an engine and a variable displacement hydraulic motor to be rotated by the pressurized oil from the variable displacement pump and is configured to be operated while the engine speed is set to be either a high idle engine speed or a given engine speed less than the high idle engine speed by an operation of a fuel regulation lever (or dial).

BACKGROUND ART

Some of the work vehicles, such as bulldozers, include a hydrostatic transmission (also hereinafter referred to as "HST"). The hydrostatic transmission includes a variable displacement pump and a variable displacement hydraulic motor. The variable displacement pump is configured to be driven by an engine, whereas the variable displacement hydraulic motor is configured to be rotated by the pressurized oil from the variable displacement pump. Further, the torque absorbable by the hydrostatic transmission can be changed or the travel speed of the vehicle can be continuously changed through the displacement control by changing the angle of a swash plate in the variable displacement pump or the variable displacement hydraulic motor.

Further, the work vehicles such as bulldozers are configured to be operated while the engine speed is set to be either the high idle engine speed or a given engine speed less than the high idle engine speed by an operation of the fuel regulation lever/dial (see, e.g., Japan Laid-open Patent Application Publication No. JP-A-2005-233420). In executing a heavy load operation, for instance, the high idle engine speed is selected and the engine is thus rotated at the maximum rated engine speed. In executing a light load operation or self-propelling, by contrast, the vehicles are operated at a low engine speed set by an operation of the fuel regulation lever. It is thereby possible to execute reduction in noises to be produced in operations, reduction in fuel consumption, and the like.

By the way, reduction in fuel consumption has been demanded for the work vehicles such as bulldozers in recent years.

Japan Laid-open Patent Application Publication No. JP-A-S63-070311 discusses a technology aimed at reduction in fuel consumption for a construction vehicle. However, the construction vehicle is not the hydrostatic transmission vehicle intended for the present invention, and therefore it is not necessarily valid to simply compare them. In the technology described in Japan Laid-open Patent Application Publication No. JP-A-S63-070311, a regulation line to determine the maximum engine speed is shifted to a line corresponding to an engine speed less than the maximum rated engine speed when the gear stage of the transmission is detected as the maximum gear stage. Japan Laid-open Patent Application Publication No. JP-A-S63-070311 describes that the fuel consumption rate is thus enhanced when the maximum gear stage is selected.

SUMMARY

The work vehicle (bulldozer) described in Japan Laid-open Patent Application Publication No. JP-A-2005-233420 is configured to be operated while the engine speed is set to be a low engine speed less than the high idle engine speed through the operation of the fuel regulation lever. When operated at the low engine speed less than the high idle engine speed, the vehicle is allowed to execute operations while keeping traction force (travel drive torque) roughly the same as that produced at the high idle engine speed. It is thereby possible to execute reduction in noises in operations, reduction in fuel consumption, and the like. On the other hand, the maximum vehicle speed obtained herein will be lower than that obtained when the vehicle is operated at the high idle engine speed.

By the way, when the fuel consumption rate is plotted on a chart representing a torque characteristic curve of a work vehicle engine, the point of the least fuel consumption rate is generally plotted not in the vicinity of the high idle engine speed but in the vicinity of the point where the maximum torque (maximum torque point) is produced. Further, the point of the least fuel consumption rate is highly likely to get closer to the maximum torque point in response to reinforcement for exhaust gas regulation. It is thereby effective, even in terms of the fuel consumption rate, to operate the vehicle by setting the engine speed to be a low engine speed less than the high idle engine speed. It should be noted that the fuel consumption rate refers to mass of fuel required for producing unit power for unit time and is expressed by the unit of "g/(ps·h)".

The research of general usage of the bulldozers, conducted by the inventors of the present application, reveals that the bulldozers are frequently operated under a low travel load condition while the engine is set to be the high idle engine speed. Further, the research reveals that the bulldozers are rarely operated at about the maximum vehicle speed. Simply put, the research reveals that operators frequently operate bulldozers at a high idle engine speed regardless of the fact that operations at a low engine speed less than the high idle engine speed is more advantageous than those at the high idle engine speed in terms of fuel efficiency.

The plausible reason for the above is that the operators feel bothersome to frequently switch the fuel regulation lever in accordance with working conditions or the operators dislike reduction in the maximum vehicle speed described above.

The present invention is produced for resolving the aforementioned drawback. It is an object of the present invention to produce a work vehicle for achieving low fuel consumption and the maximum vehicle speed roughly the same as that of the well-known work vehicles without making an operator frequently switch the fuel regulation lever.

It should be noted that the vehicle described in the aforementioned Japan Laid-open Patent Application Publication No. JP-A-S63-070311 is not the hydrostatic transmission vehicle intended for the present invention, and therefore it is not necessarily valid to simply compare them. When they are dared to be compared, however, the vehicle of Japan Laid-open Patent Application Publication No. JP-A-S63-070311 has a drawback similar to the aforementioned one because the maximum vehicle speed thereof will be lower than that of the well-known work vehicles even if an accelerator pedal is fully pressed down while the maximum gear stage is selected.

A control device for a hydrostatic transmission vehicle according to a first aspect of the present invention is a device to be used for a hydrostatic transmission vehicle equipped with a hydrostatic transmission including a variable displacement pump to be driven by an engine and a variable displacement hydraulic motor to be rotated by a pressurized oil from the variable displacement pump. The control device includes a vehicle speed setting section, a low rotation matching engine speed setting section and a pump and motor displacement control section. The vehicle speed setting section is configured to set a set vehicle speed based on both a forward/rearward travel command and a gear stage command instructed by an operator. The low rotation matching engine speed setting section stores a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range. Further, the low rotation matching engine speed setting section is configured to set the upper limit of the engine speed using the set vehicle speed set by the vehicle speed setting section based on the correspondence. The pump and motor displacement control section is configured to control respective displacements of the variable displacement pump and the variable displacement hydraulic motor based on the set vehicle speed for allowing a vehicle speed to reach the set vehicle speed set by the vehicle speed setting section even when the engine is rotated at the partial engine speed.

The device is configured to automatically set the engine speed to be the partial engine speed lower than the high idle engine speed when the set vehicle speed is in the preliminarily set low and intermediate speed range even if the engine speed is set to be the high idle engine speed by an operator. It should be noted that the vehicle speed cannot reach an operator's desired vehicle speed when the engine speed is set to be a lower engine speed even if the displacements of the variable displacement pump and the variable displacement hydraulic motor are controlled similarly to the well-known work vehicles. In response to this, the displacements of the variable displacement pump and the variable displacement hydraulic motor are respectively controlled based on the set vehicle speed for allowing the vehicle speed to reach the set vehicle speed set by the vehicle speed setting section even if the engine is rotated at the partial engine speed when the set vehicle speed is in the low and intermediate speed range. As a more detailed explanation, the variable displacement pump is controlled to have a displacement larger than that of the variable displacement pump in the well-known work vehicles when the set vehicle speed is in a low speed range, i.e., a relatively lower part of the low and intermediate speed range. On the other hand, the variable displacement hydraulic motor is controlled to have a displacement smaller than that of the variable displacement hydraulic motor in the well-known work vehicles when the set vehicle speed is in an intermediate speed range. Accordingly, the vehicle speed is allowed to reach an operator's desired vehicle speed even if the engine speed is low.

The hydrostatic transmission vehicle is herein automatically controlled and operated at the predetermined partial engine speed when the set vehicle speed is not required to be high even if an operation at the high idle engine speed is instructed by an operator. Therefore, a fuel efficiency can be enhanced by preventing increase in a fuel consumption rate. Further, the gear ratio is configured to be changed by respectively controlling the displacements of the variable displacement pump and the variable displacement hydraulic motor. Therefore, the vehicle speed is allowed to reach a desired vehicle speed even when the engine speed is set to be low.

A control device for a hydrostatic transmission vehicle according to a second aspect of the present invention is a device to be used for a hydrostatic transmission vehicle equipped with a hydrostatic transmission including a variable displacement pump to be driven by an engine and a variable displacement hydraulic motor to be rotated by a pressurized oil from the variable displacement pump. The control device includes a vehicle speed setting section, a low rotation matching engine speed setting section and a pump and motor displacement control unit. The vehicle speed setting section is configured to set a set vehicle speed based on both a forward/rearward travel command and a gear stage command instructed by an operator. The low rotation matching engine speed setting section stores a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range. Further, the low rotation matching engine speed setting section is configured to set the upper limit of the engine speed using the set vehicle speed set by the vehicle speed setting section based on the correspondence. The pump and motor displacement control section preliminarily stores a correspondence of a displacement of the variable displacement pump with respect to the set vehicle speed and a correspondence of a displacement of the variable displacement hydraulic motor with respect to the set vehicle speed for allowing a vehicle speed to reach the set vehicle speed set by the vehicle speed setting section even when the engine is rotated at the partial engine speed. Further, the pump and motor displacement control section is configured to control the respective displacements of the variable displacement pump and the variable displacement hydraulic motor based on the set vehicle speed set by the vehicle speed setting section.

Similarly to the above, the device is configured to automatically set the engine speed to be the partial engine speed lower than the high idle engine speed when the set vehicle speed is in the preliminarily set low and intermediate speed range even if the engine speed is set to be the high idle engine speed by an operator. As a more detailed explanation, the device stores the correspondence of the upper limit of the engine speed with respect to the set vehicle speed for limiting the upper limit of the engine speed to be the partial engine speed set to be lower than the high idle engine speed. The upper limit of the engine speed is obtained based on the correspondence using the set vehicle speed set by the vehicle speed setting section. Then, the displacements of the variable displacement pump and the variable displacement hydraulic motor are controlled based on the set vehicle speed for allowing the vehicle speed to reach the set vehicle speed set by the vehicle speed setting section even when the engine is rotated at the partial engine speed. Accordingly, the vehicle speed is allowed to reach an operator's desired vehicle speed even when the engine speed is low.

A control device for a hydrostatic transmission vehicle according to a third aspect of the present invention is a device to be used for a hydrostatic transmission vehicle equipped with a hydrostatic transmission including a variable displacement pump to be driven by an engine and a variable displacement hydraulic motor to be rotated by a pressurized oil from the variable displacement pump. The control device includes a vehicle speed setting section, a low rotation matching engine speed setting section, a pump and motor displacement control section and a set vehicle speed correction section. The vehicle speed setting section is configured to set a set vehicle speed based on both a forward/rearward travel command and a gear stage command instructed by an operator. The low rotation matching engine speed setting section stores a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range. Further, the low rotation matching engine speed setting section is configured to set the upper limit of the engine speed using the set vehicle speed set by the vehicle speed setting section based on the correspondence. The pump and motor displacement control section preliminarily stores a correspondence of a displacement of the variable displacement pump with respect to the set vehicle speed and a correspondence of a displacement of the variable displacement hydraulic motor with respect to the set vehicle speed for allowing a vehicle speed to reach the set vehicle speed set by the vehicle speed setting section when the engine is rotated at the high idle engine speed. Further, the pump and motor displacement control section is configured to respectively control the displacements of the variable displacement pump and the variable displacement hydraulic motor based on the set vehicle speed. The set vehicle speed correction section is configured to correct the set vehicle speed set by the vehicle speed setting section with the upper limit of the engine speed set by the low rotation matching engine speed setting section for allowing the vehicle speed to reach the set vehicle speed set by the vehicle speed setting section when the engine is rotated at the partial engine speed. Further, the set vehicle speed correction section is configured to output the corrected set vehicle speed to the pump and motor displacement control section.

Similarly to the above, the device is configured to automatically set the engine speed to be the partial engine speed lower than the high idle engine speed when the set vehicle speed is in the preliminarily set low and intermediate speed range even if the engine speed is set to be the high idle engine speed by an operator. As a more detailed explanation, the device stores the correspondence of the upper limit of the engine speed with respect to the set vehicle speed for limiting the upper limit of the engine speed to be the partial engine speed set to be lower than the high idle engine speed. The upper limit of the engine speed is obtained based on the correspondence using the set vehicle speed set by the vehicle speed setting section. Further, the device preliminarily stores the correspondence of the displacement of the variable displacement pump with respect to the set vehicle speed and the correspondence of the displacement of the variable displacement hydraulic motor with respect to the set vehicle speed for allowing the vehicle speed to reach the set vehicle speed set by the vehicle speed setting section when the engine is rotated at the high idle engine speed. Yet further, the set vehicle speed set by the vehicle speed setting section is corrected with the upper limit of the engine speed set by the low rotation matching setting section for allowing the vehicle speed to reach the set vehicle speed set by the vehicle speed setting section when the engine is rotated at the partial engine speed. The respective displacements are controlled with the corrected set vehicle speed.

Similarly to the above, the vehicle speed is herein allowed to reach an operator's desired vehicle speed even when the engine is rotated at the partial engine speed. Further, the displacements of the variable displacement pump and the variable displacement hydraulic motor are respectively controlled by correcting the set vehicle speed in executing the above control processing. Therefore, the pump and motor displacement control section stores the correspondences of the respective displacements with respect to the set vehicle speed under the condition that the engine is rotated at the high idle engine speed, similarly to the well-known work vehicles. Thus, the device is not required to store a plurality of maps. Therefore, the device can easily cope with such a case that the partial engine speed is required to be changed.

A control device for a hydrostatic transmission vehicle according to a fourth aspect of the present invention is a device to be used for a hydrostatic transmission vehicle equipped with a hydrostatic transmission including a variable displacement pump to be driven by an engine and a variable displacement hydraulic motor to be rotated by a pressurized oil from the variable displacement pump. The control device includes a vehicle speed setting section, a low rotation matching engine speed setting section, a set vehicle speed correction section and a pump and motor displacement control section. The vehicle speed setting section is configured to set a set vehicle speed based on both a forward/rearward travel command and a gear stage command instructed by an operator. The low rotation matching engine speed setting section stores a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range. The low rotation matching engine speed setting section is configured to set a low rotation matching engine speed as the upper limit of the engine speed using the set vehicle speed set by the vehicle speed setting section based on the correspondence. The set vehicle speed correction section is configured to calculate a corrected set vehicle speed based on an equation "the corrected set vehicle speed=the set vehicle speed×(the high idle engine speed/the low rotation matching engine speed)" using the set vehicle speed set by the vehicle speed setting section and the low rotation matching engine speed. The pump and motor displacement control section preliminarily stores a correspondence of a displacement of the variable displacement pump with respect to the set vehicle speed and a correspondence of a displacement of the variable displacement hydraulic motor with respect to the set vehicle speed for allowing a vehicle speed to reach the set vehicle speed set by the vehicle speed setting section when the engine is rotated at the high idle engine speed. Further, the pump and motor displacement control section is configured to control the respective displacements of the variable displacement pump and the variable displacement hydraulic motor based on the corrected set vehicle speed calculated by the set vehicle speed correction section.

Similarly to the above, the device is configured to automatically set the engine speed to be the partial engine speed lower than the high idle engine speed when the set vehicle speed is in the preliminarily set low and intermediate speed range. Further, the device preliminarily stores the correspondence of the variable displacement pump with respect to the set vehicle speed and the correspondence of the variable displacement hydraulic motor with respect to the set vehicle speed for allowing the vehicle speed to reach the set vehicle speed set by the vehicle speed setting section when the engine is rotated at the high idle engine speed. The respective displacements are controlled with the corrected set vehicle speed calculated based on the equation "the corrected set vehicle speed=the set vehicle speed×(the high idle engine speed/the low rotation matching engine speed)".

Similarly to the third aspect of the present invention, the vehicle speed is allowed to reach an operator's desired vehicle speed even when the engine is rotated at the partial engine speed. Further, the device is not required to store a plurality of maps. Therefore, the device can easily cope with such a case that the partial engine speed is required to be changed.

A control device for a hydrostatic transmission vehicle according to a fifth aspect of the present invention relates to the control device according to one of the first to fourth aspects of the present invention. In the control device, the pump and motor displacement control section is configured to execute the following controls.

When the set vehicle speed is in a first speed range as a lower part of the low and intermediate speed range, the pump and motor displacement control section is configured to execute a control of increasing the displacement of the variable displacement pump in proportion to increase in the set vehicle speed and keeping the displacement of the variable displacement hydraulic motor constant. When the set vehicle speed is in a second speed range higher than the first speed range in the low and intermediate speed range, on the other hand, the pump and motor displacement control section is configured to execute a control of keeping the displacement of the variable displacement pump to a maximum displacement and reducing the displacement of the variable displacement hydraulic motor in proportion to increase in the set vehicle speed after the displacement of the variable displacement pump reaches the maximum displacement.

In this case, the gear ratio of the hydrostatic transmission can be controlled continuously (without stages) by controlling the displacements of the variable displacement pump and the variable displacement hydraulic motor.

A control device for a hydrostatic transmission vehicle according to a sixth aspect of the present invention relates to the control device according to one of the first to fourth aspects of the present invention. In the control device, a high speed range is a speed range higher than the low and intermediate speed range. The high speed range is set as a range that the vehicle speed cannot reach the set vehicle speed set by the vehicle speed setting section by the controls of the variable displacement pump and the variable displacement hydraulic motor. The low rotation matching engine speed setting section is configured to control and increase the engine speed from the partial engine speed to the high idle engine speed in proportion to increase in the set vehicle speed when the set vehicle speed is in the high speed range.

In this case, the engine speed is configured to be increased in proportion to increase in the set vehicle speed when the set vehicle speed is further increased in the high speed range where the vehicle speed cannot be controlled through the displacement controls of the variable displacement pump and the variable displacement hydraulic motor. Therefore, the vehicle speed is allowed to reach the set vehicle speed based on an operator's demand by executing one of the controls of the first to fourth aspects of the present invention without changing the hardware configuration, i.e., without enlarging the variable displacement pump and the variable displacement hydraulic motor, even when the vehicle speed cannot be controlled through the displacement controls of the variable displacement pump and the variable displacement hydraulic motor.

The engine speed herein gets closer to the high idle engine speed in proportion to increase in the set vehicle speed in the high speed range. Therefore, a fuel efficiency is not improved so much when the high speed range is only focused. As described above, however, frequency of using the bulldozers at the maximum vehicle speed is quite low especially in the normal usage conditions of the bulldozers. In other words, the bulldozers are operated at the partial engine speed in the speed range where the bulldozers are frequently used. Therefore, a fuel efficiency is improved in terms of the entire usage conditions.

Meanwhile, a vehicle speed limit is set in accordance with the engine speed for preventing occurrence of engine stalls and the respective displacements are determined based on the vehicle speed limit in the controls of the hydrostatic transmissions of the well-known bulldozers, i.e., in the displacement controls of the variable displacement pump and the variable displacement hydraulic motor. For example, controls are executed for increasing the displacement of the variable displacement hydraulic motor when the engine speed is reduced and for reducing the displacement of the variable displacement pump when the displacement of the variable displacement hydraulic motor reaches the maximum displacement. In other words, the hydrostatic transmissions of the well-known bulldozers basically execute controls of respectively limiting the displacements of the variable displacement pump and the variable displacement hydraulic motor based only on the engine speed.

According to the aforementioned well-known control method, an engine speed, allowing matching of an engine output torque characteristic and a torque limit characteristic of the hydrostatic transmission, varies greatly when the pressure under load in the hydrostatic transmission (i.e., a hydraulic pressure in a hydraulic circuit including the variable displacement pump and the variable displacement hydraulic motor) varies as represented in FIG. 11. It should be noted that FIG. 11 is a chart where the horizontal axis represents engine speed and the vertical axis represents torque. In the chart, a line EL represents an engine output torque characteristic and a line HL represents an absorption torque characteristic of the hydrostatic transmission for various pressures under load. Further, P1 represents a condition with the largest pressure under load. Pressure under load is gradually reduced in proportion to increase in the numeric value of P (i.e., P2, P3, ...) and P8 represents the smallest pressure under load. In the case of FIG. 11, the engine speed for the matching is reduced to 1600 rpm when the pressure under load is maximized even if the hydrostatic transmission vehicle is operated by setting the engine speed to be the high idle engine speed of 2270 rpm. In other words, the engine speed for the matching varies in a range of 670 rpm by the pressure under load.

The aforementioned large variation in the matching engine speed due to variation in the pressure under load is not preferable in executing a control using the control device of the first aspect of the present invention.

In view of the above, a control device for a hydrostatic transmission vehicle according to a seventh aspect of the present invention is configured to execute a control for preventing large variation in matching engine speed due to variation in load. Specifically, the control device related to the control device according to one of the first to fourth aspects of the present invention. The control device includes a hydraulic sensor, a torque limit setting section, a vehicle speed limit setting section and a vehicle speed selection section. The hydraulic sensor detects a pressure in a hydraulic circuit including the variable displacement pump and the variable displacement hydraulic motor. The torque limit setting section is configured to obtain the engine speed and set a torque limit usable for the hydrostatic transmission based on the obtained engine speed. The vehicle speed limit setting section is configured to set a vehicle speed limit based on the detected pressure in the hydraulic circuit and the torque limit. The vehicle speed selection section is configured to select a lower one of the set vehicle speed set by the vehicle speed setting section and the vehicle speed limit set by the vehicle speed limit set by the vehicle speed limit setting section. Further, the pump and motor displacement control section is configured to execute the control using the vehicle speed selected by the vehicle speed selection section as the set vehicle speed.

In other words, the control device for a hydrostatic transmission vehicle of the seventh aspect of the present invention is configured to execute not only the control in the first aspect of the present invention but also a control of determining the respective displacements of the variable displacement pump and the variable displacement hydraulic motor based on the engine speed and the circuit pressure of the hydrostatic transmission.

Under the control in the first aspect and the like of the present invention, the control device firstly sets the set vehicle speed for allowing matching of the engine output torque and the torque limit of the hydrostatic transmission at a lower engine speed. Specifically, the vehicle speed is firstly set for enhancing a fuel efficiency and the respective displacements of the variable displacement pump and the variable displacement hydraulic motor are controlled. On the other hand, the vehicle speed limit is set for keeping the matching engine speed constant and the respective displacements of the variable displacement pump and the variable displacement hydraulic motor are controlled in order to prevent a situation that the matching engine speed is reduced due to increase in load and lack of the engine output is thereby caused.

According to the control method in the seventh aspect of the present invention, it is possible to keep the engine speed, allowing matching of the engine output torque characteristic and the torque limit of the hydraulic transmission, at a constant level even when the pressure under load varies in the hydrostatic transmission, as represented in FIG. 12. It should be noted that FIG. 12 is a chart where the horizontal axis represents engine speed and the vertical axis represents torque. In the chart, a line EL represents an example of the engine output torque characteristic and a line T represents an example of the absorption torque characteristic of the hydrostatic transmission. The absorption torque characteristic is herein constant regardless of the pressure under load. In the case of FIG. 12, the engine speed is automatically limited to the partial engine speed of 1900 rpm under the control of the first aspect of the present invention even when the hydrostatic transmission vehicle is operated by setting the engine speed to be the high idle engine speed of 2270 rpm. In such as case of the absorption torque characteristic represented in FIG. 12, reduction in the engine speed is limited to 1790 rpm even when the pressure under load is maximized under the condition. In other words, variation due to the pressure under load is inhibited to 110 rpm.

A control device for a hydrostatic transmission vehicle of an eighth aspect of the present invention relates to the control device according to the seventh aspect of the present invention. In the control device, the vehicle speed limit setting section includes a table representing a relation between the vehicle speed limit and the pressure in the hydraulic circuit. The table sets a lower speed range of the vehicle speed limit as a pump range where the vehicle speed limit is set for controlling the displacement of the variable displacement pump. On the other hand, the table sets a higher speed range of the vehicle speed limit as a motor range where the vehicle speed limit is set for controlling the displacement of the variable displacement hydraulic motor. The motor range allows the vehicle speed limit to be increased in proportion to reduction in the pressure.

As described above, it is herein required to control the displacement of the variable displacement hydraulic motor in accordance with variation in load for keeping the torque limit constant after the displacement of the variable displacement pump reaches the maximum displacement. In other words, it is ideally desirable to keep the vehicle speed limit constant regardless of pressure in the motor range that the vehicle speed limit is set after the displacement of the variable displacement pump reaches the maximum displacement. In executing such a control, however, the vehicle speed limit varies back and forth between minimum and maximum in the motor range even when the pressure slightly varies. Simply put, the hunting phenomenon occurs.

In the eighth aspect of the present invention, occurrence of the hunting phenomenon is prevented in controlling the displacement of the variable displacement hydraulic motor by setting a slope trend that the vehicle speed limit is increased in proportion to reduction in pressure in the motor range.

A control device for a hydrostatic transmission vehicle according to a ninth aspect of the present invention relates to the control device according to the seventh aspect of the present invention. In the control device, the hydraulic sensor includes a front hydraulic sensor detecting the pressure in the hydraulic circuit in a forward travel and a rear hydraulic sensor configured and arranged to detect the pressure in the hydraulic circuit in a rearward travel. The control device further includes a forward/rearward travel lever sensor configured and arranged to detect a travel direction of the vehicle and a differential pressure calculation section. The differential pressure calculation section is configured to calculate a front-rear differential pressure either by subtracting a detection value of the rear hydraulic sensor from a detection value of the front hydraulic sensor in the forward travel or by subtracting the detection value of the front hydraulic sensor from the detection value of the rear hydraulic sensor in the rearward travel based on a result detected by the forward/rearward travel lever sensor. Further, the vehicle speed limit setting section (76) is configured to set the vehicle speed limit based on the calculated front-rear differential pressure calculated by the differential pressure calculation section.

The aforementioned control device according to the ninth aspect of the present invention is preferable for applying either the seventh aspect or the eighth aspect of the present invention to a hydrostatic transmission vehicle configured to switch the forward travel and the rearward travel by changing the rotational direction of a motor.

A control device for a hydrostatic transmission vehicle according to a tenth aspect of the present invention relates to the control device according to the ninth aspect of the present invention. In the control device, the vehicle includes a left travel unit and a right travel unit. Further, the variable displacement pump includes a pump for driving the left travel unit and a pump for driving the right travel unit, whereas the variable displacement hydraulic motor includes a motor for driving the left travel unit and a motor for driving the right travel unit. Yet further, the differential pressure calculation section is configured to calculate a left front-rear differential pressure based on a detection value of the left front hydraulic sensor and a detection value of the left rear hydraulic sensor, calculate a right front-rear differential pressure based on a detection value of the right front hydraulic sensor and a detection value of the right rear hydraulic sensor, and calculate an average front-rear differential pressure by respectively weighting the left front-rear differential pressure and the right front-rear differential pressure with a detection result of the steering lever sensor and then averaging the weighted left front-rear differential pressure and the weighted right front-rear differential pressure. The vehicle speed limit setting section is configured to set the vehicle speed limit based on the average front-rear differential pressure calculated by the differential pressure calculation section.

The aforementioned control device according to the tenth aspect of the present invention is preferable for applying the ninth aspect of the present invention to a hydrostatic transmission vehicle including: a right travel unit and a left travel unit; a pump and a motor for driving the left travel unit; and a pump and a motor for driving the right travel unit.

A control device for a hydrostatic transmission vehicle according to an eleventh aspect of the present invention relates to the control device according to one of the first to fourth aspects of the present invention. The control device further includes a hydraulic sensor, a torque limit setting section, a torque control pump displacement setting section, a pump displacement selection section, a PID control section and a motor displacement selection section. The hydraulic sensor detects a pressure in a hydraulic circuit including the variable displacement pump and the variable displacement hydraulic motor. The torque limit setting section is configured to obtain the engine speed and set a torque limit usable for the hydrostatic transmission based on the obtained engine speed. The torque control pump displacement setting section is configured to set a torque control pump displacement based on the detected pressure in the hydraulic circuit and the torque limit set by the torque limit setting section. The pump displacement selection section is configured to select a smaller one of the pump displacement obtained through the control by the pump and motor displacement control section and the pump displacement set by the toque control pump displacement setting section and output the selected one of the pump displacements as a pump displacement command value for controlling the variable displacement pump. The PID control section is configured to set the motor displacement for allowing the hydraulic pressure in the hydraulic circuit to be a preliminarily set target pressure by executing a PID control. The motor displacement selection section is configured to select a larger one of the motor displacement obtained through the control by the pump and motor displacement control section and the motor displacement set by the PID control section and output the selected one of the motor displacements as a motor displacement command value for controlling the variable displacement hydraulic motor.

Similarly to the seventh aspect of the present invention, the control device is configured to firstly set the vehicle speed for enhancing a fuel efficiency and control the respective displacements of the variable displacement pump and the variable displacement hydraulic motor. On the other hand, the control device is configured to control the respective displacements of the variable displacement pump and the variable displacement hydraulic motor for keeping the matching engine speed constant in order to prevent a situation that the matching engine speed is reduced due to increase in load and lack of the engine output is thereby caused.

Especially in the eleventh aspect of the present invention, the motor displacement is set through the PID control. It is thereby possible to accurately and reliably set the motor displacement to be a desired motor displacement.

A control device for a hydrostatic transmission vehicle according to a twelfth aspect of the present invention relates to the control device according to the eleventh aspect of the present invention. In the control device, the hydraulic sensor includes a front hydraulic sensor detecting the pressure in the hydraulic circuit in a forward travel and a rear hydraulic sensor configured and arranged to detect the pressure in the hydraulic circuit in a rearward travel. The control device further includes a forward/rearward travel lever sensor configured and arranged to detect a travel direction of the vehicle and a differential pressure calculation section. The differential pressure calculation section is configured to calculate a front-rear differential pressure either by subtracting a detection value of the rear hydraulic sensor from a detection value of the front hydraulic sensor in the forward travel or by subtracting the detection value of the front hydraulic sensor from the detection value of the rear hydraulic sensor in the rearward travel based on a result detected by the forward/rearward travel lever sensor. Each of the torque control pump displacement setting section and the PID control section is configured to set a corresponding one of the pump displacement and the motor displacement based on the front-rear differential pressure calculated by the differential pressure calculation section.

The aforementioned control device according to the twelfth aspect of the present invention is preferable for applying the eleventh aspect of the present invention to a hydrostatic transmission vehicle configured to switch the forward travel and the rearward travel by changing the rotational direction of a motor.

A control device for a hydrostatic transmission vehicle according to a thirteenth aspect of the present invention relates to the control device according to the twelfth aspect of the present invention. The vehicle includes a left travel unit and a right travel unit. The variable displacement pump includes a pump for driving the left travel unit and a pump for driving the right travel unit, whereas the variable displacement hydraulic motor includes a motor for driving the left travel unit and a motor for driving the right travel unit. The control device further includes a steering lever sensor configured and arranged to detect a rightward/leftward steering stroke. The differential pressure calculation section is configured to calculate a left front-rear differential pressure based on a detection value of the left front hydraulic sensor and a detection value of the left rear hydraulic sensor, calculate a right front-rear differential pressure based on a detection value of the right front hydraulic sensor and a detection value of the right rear hydraulic sensor, and calculate an average front-rear differential pressure by respectively weighting the left front-rear differential pressure and the right front-rear differential pressure with a result detected by the steering lever sensor and averaging the weighted left front-rear differential pressure and the weighted right front-rear differential pressure. Further, each of the torque control pump displacement setting section and the PID control section is configured to set a corresponding one of the pump displacement and the motor displacement based on the front-rear differential pressure calculated by the differential pressure calculation section.

The aforementioned control device according to the thirteenth aspect of the present invention is preferable for applying the twelfth aspect of the present invention to a hydrostatic transmission vehicle including: a left travel unit and a right travel unit; a pump and a motor for driving the left travel unit; and a pump and a motor for driving the right travel unit.

Advantageous effects of the Invention

According to the present invention described above, the vehicle equipped with the hydrostatic transmission can achieve a fuel efficiency better than fuel efficiencies of the well-known ones without causing drawbacks such as reduction in the vehicle speed even when a hardware configuration thereof is not particularly changed.

BRIEF DESCRIPTION OF THE DRAWINGS

FIG. 6 is a table representing the relation between travel states of the vehicle and differential pressures of the hydraulic circuit.

DESCRIPTION OF THE EMBODIMENTS

A control device according to an exemplary embodiment of the present invention is mounted in, for instance, a bulldozer as a hydrostatic transmission vehicle. In the following explanation, the bulldozer will be exemplified as a hydrostatic transmission vehicle.

Overall Structure of Bulldozer

Figure 1:
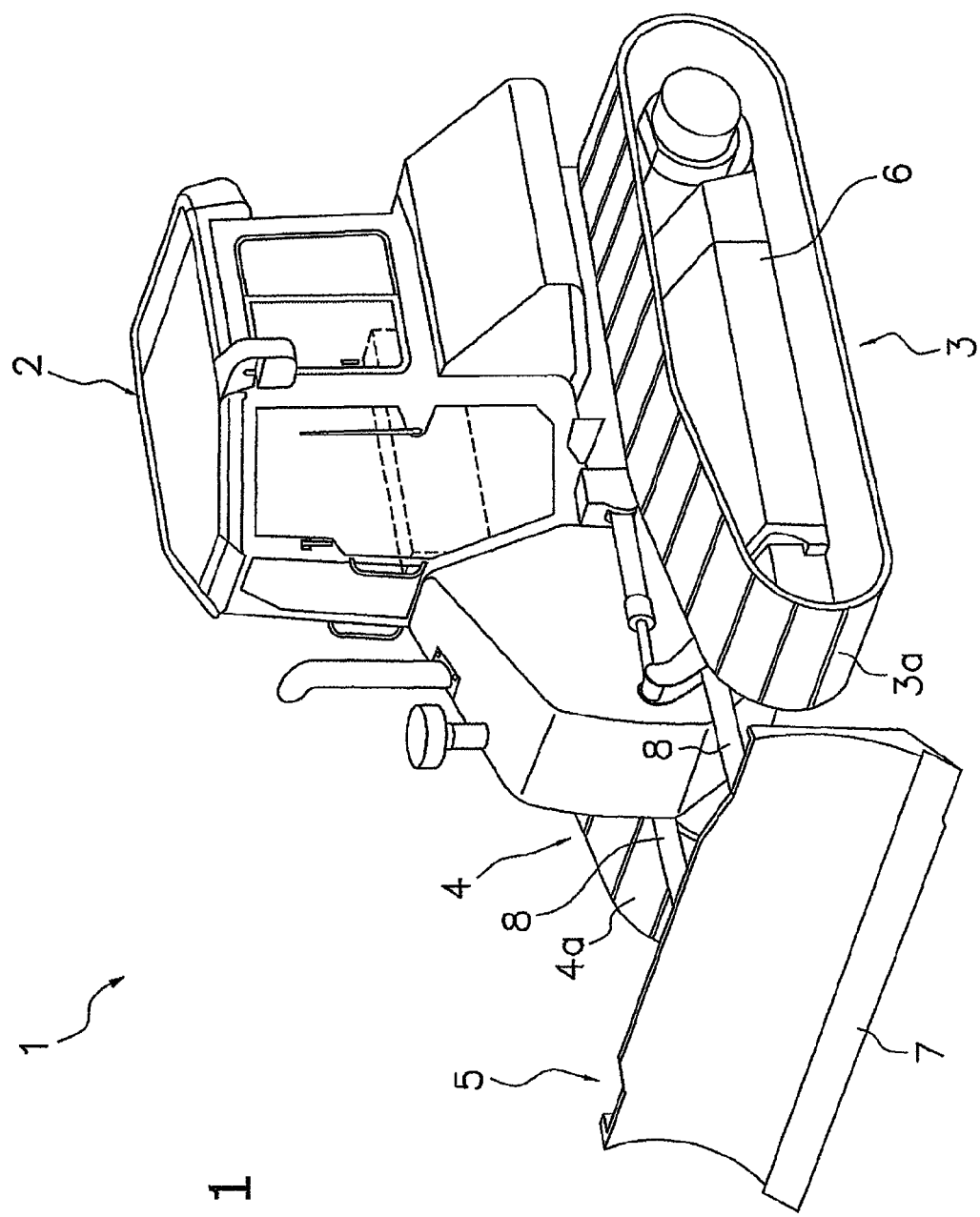
FIG. 1 is an external perspective view of a bulldozer adopting an exemplary embodiment of the present invention.

As illustrated in FIG. 1, a bulldozer 1 includes a cab (operating room) 2, a pair of a left travel unit 3 and a right travel unit 4, a work implement 5, a main frame (not illustrated in the figures) and a pair of track frames 6.

The main frame is a base member forming the framework of the bulldozer 1. The work implement 5 is mounted on the front part of the main frame. The travel unit 3 is mounted on the left side of the main frame, whereas the travel unit 4 is mounted on the right side of the main frame. The cab 2 is mounted on the top of the main frame.

The track frames 6 are attached to the right and left sides of the main frame. It should be noted that FIG. 1 illustrates only the left-side track frame.

The left-side travel unit 3 is attached to the left-side track frame 6, whereas the right-side travel unit 4 is attached to the right-side track frame 6. The right-side travel unit 3 includes a crawler belt 3a, whereas the left-side travel unit 4 includes a crawler belt 4a. Each of the crawler belts 3a and 4a is an endless belt formed by coupling a plurality of plate-like shoes. Each of the crawler belts 3a and 4a is wrapped around a plurality of rollers disposed up and down. Circulations of the crawler belts 3a and 4a allow the bulldozer 1 to travel over irregular terrain.

The cab 2 is disposed on the rear part of the main frame. The cab 2 is equipped with a seat allowing an operator to sit thereon, levers for executing a variety of operations, switches for setting the vehicle speed, pedals, meters and gauges, and the like in the inside thereof. It should be noted that a steering lever is included in the levers for executing a variety of operations. Further, a shift-up button and a shift-down button are included in the switches for setting the vehicle speed.

The work implement 5 includes a blade 7 and a pair of hydraulic cylinders 8. The blade 7 is allowed to be moved and tilted in a predetermined direction in conjunction with expansion and contraction of the pair of hydraulic cylinders 8.

Hydraulic Circuit System

Figure 2:
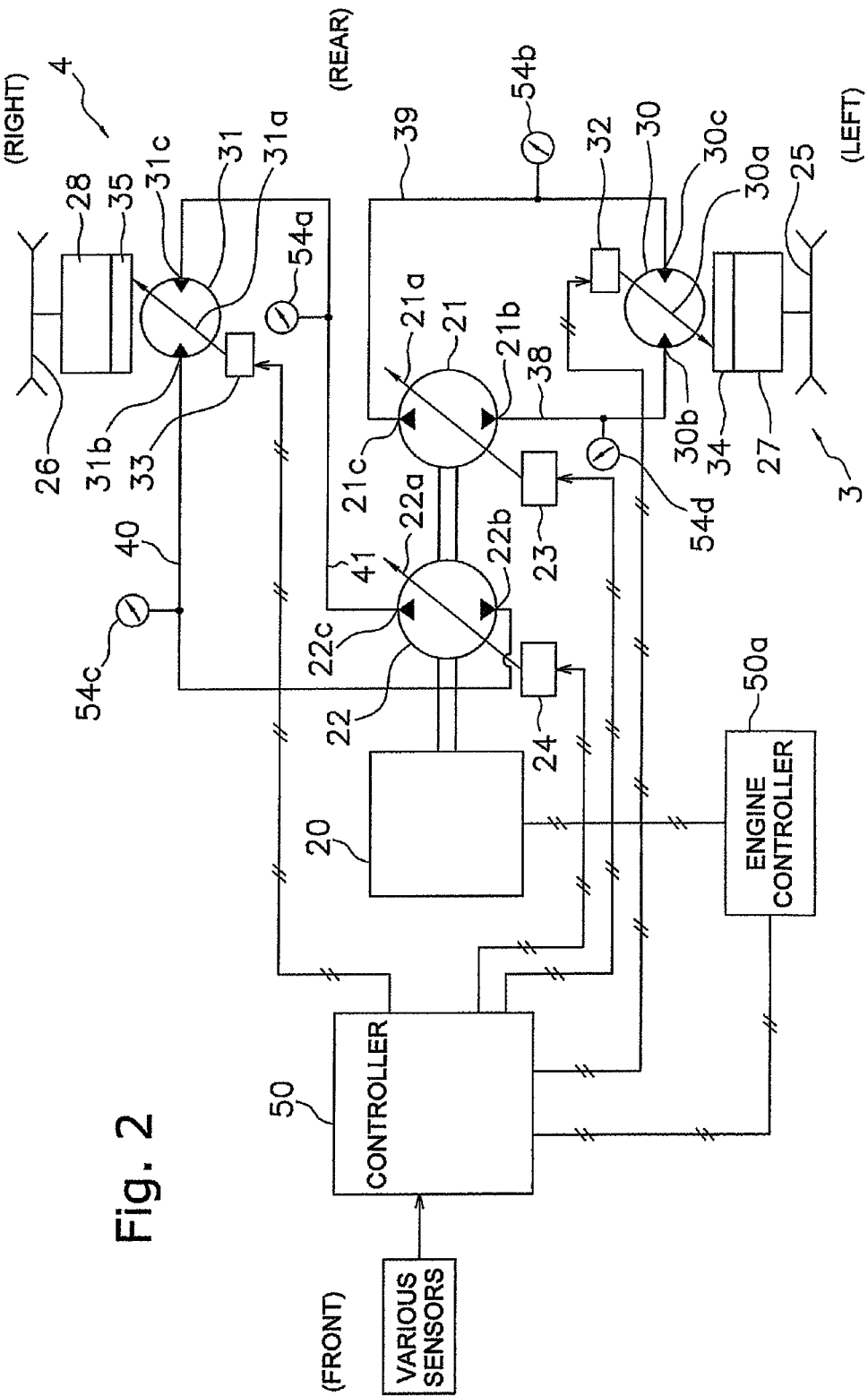
FIG. 2 is a diagram illustrating a system including hydraulic and control circuits of the bulldozer.

FIG. 2 illustrates the overview of the system mainly including a hydraulic circuit of the present vehicle. As illustrated in FIG. 2, an output shaft of an engine 20 is coupled to a drive shaft of a left variable displacement pump 21 and a drive shaft of a right variable displacement pump 22. A swash plate 21a of the left variable displacement pump 21 is driven and set to be in a given tilt position (i.e., at a given tilt angle) by a left pump swash plate drive unit 23, whereas a swash plate 22a of the right variable displacement pump 22 is driven and set to be in a given tilt position (i.e., at a given tilt angle) by a right pump swash plate drive unit 24.

On the other hand, a sprocket 25 included in the left travel unit 3 is coupled to a drive shaft of a left variable displacement hydraulic motor 30 through a left final reduction gear 27, whereas a sprocket 26 included in the right travel unit 4 is coupled to a drive shaft of a right variable displacement hydraulic motor 31 through a right final reduction gear 28. A swash plate 30a of the left variable displacement hydraulic motor 30 is driven and set to be in a given tilt position (i.e., at a given tilt angle) by a left motor swash plate drive unit 32, whereas a swash plate 31a of the right variable displacement hydraulic motor 31 is driven and set to be in a given tilt position (i.e., at a given tilt angle) by a right motor swash plate drive unit 33.

It should be noted that a left brake unit 34 is disposed on the drive shaft of the left variable displacement hydraulic motor 30 for stopping rotations of the left variable displacement hydraulic motor 30, whereas a right brake unit 35 is disposed on the drive shaft of the right variable displacement hydraulic motor 31 for stopping rotations of the right variable displacement hydraulic motor 31.

Further, an input/output port 30b of the left variable displacement hydraulic motor 30 is connected to a discharge/intake port 21b of the left variable displacement pump 21 through an oil path 38, whereas an output/input port 30c of the left variable displacement hydraulic motor 30 is connected to an intake/discharge port 21c of the left variable displacement pump 21 through an oil path 39.

Likewise, an input/output port 31b of the right variable displacement hydraulic motor 31 is connected to a discharge/intake port 22b of the right variable displacement pump 22 through an oil path 40, whereas an output/input port 31c of the right variable displacement hydraulic motor 31 is connected to an intake/discharge port 22c of the right variable displacement pump 22 through an oil path 41.

In the aforementioned system configuration, signals are inputted into a controller 50 from a variety of sensors, and the pump swash plate drive units 23 and 24 of the variable displacement pumps 21 and 22, and the motor swash plate drive units 32 and 33 of the variable displacement hydraulic motors 30 and 31 are configured to be driven and controlled by control signals outputted from the controller 50.

Further, the controller 50 is configured to send an engine speed command signal to an engine controller 50a based on signals from a variety of sensors. The engine controller 50a is configured to control the engine 20 based on the received engine speed command signal.

Control Blocks (First Exemplary Embodiment)

Figure 3:
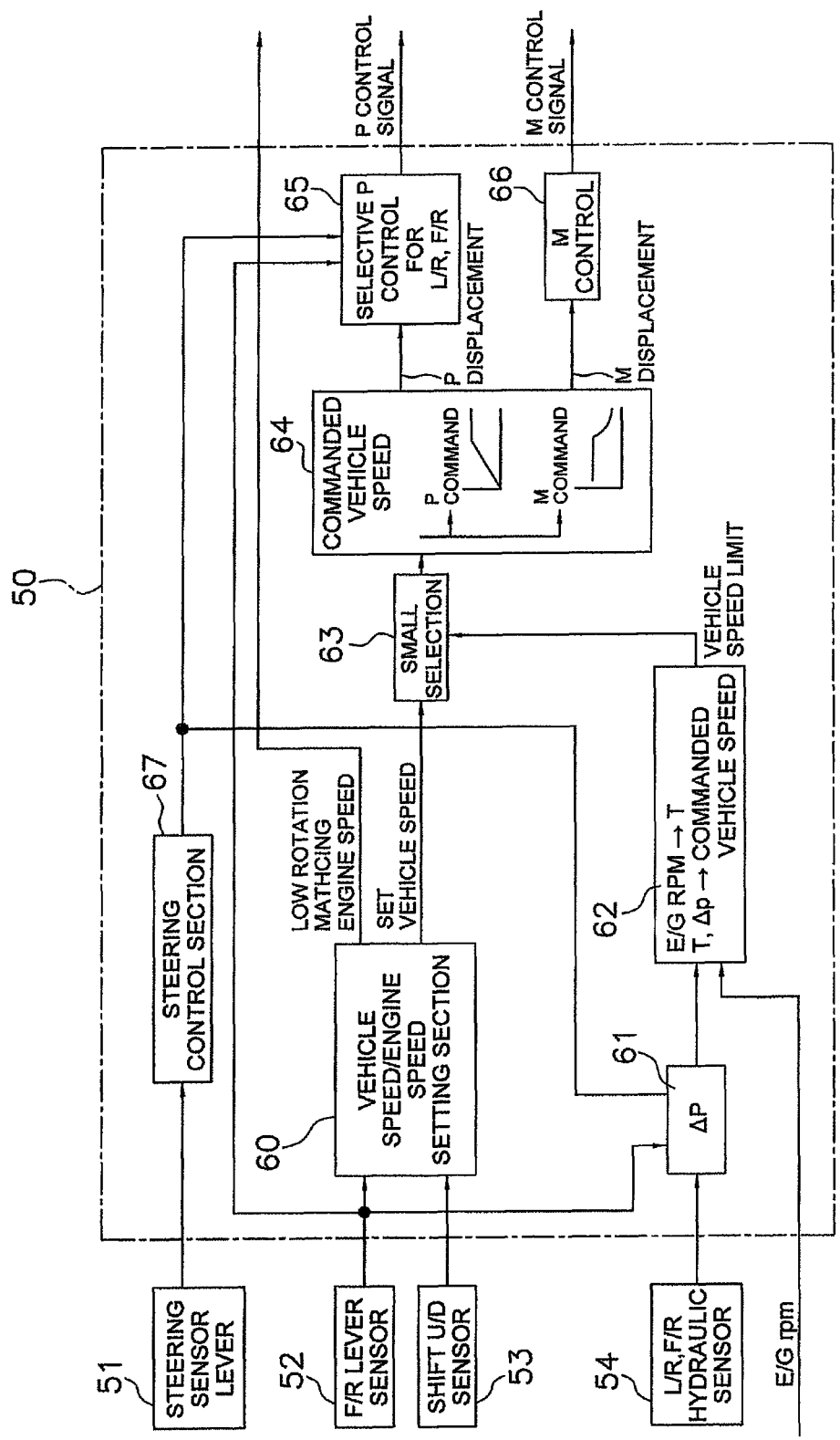
FIG. 3 is a functional block diagram of a controller of the bulldozer.

FIG. 3 illustrates a control block diagram of the present vehicle according to a first exemplary embodiment. FIG. 3 illustrates a variety of sensors connected to the controller 50 and also illustrates functions of the controller 50 as blocks.

Sensor

A steering lever sensor 51, a forward/rearward travel lever sensor 52, a shift-up/shift-down button sensor 53 and a hydraulic sensor 54 for detecting pressures of the respective oil paths illustrated in FIG. 2 are connected to the controller 50. Further, a signal indicating the engine speed is inputted into the controller 50. It should be noted that the engine speed signal may be inputted into the controller 50 either from the engine controller 50a or directly from an engine speed sensor disposed in the engine 20. The steering lever sensor 51 is a sensor for detecting a rightward/leftward stroke of a steering lever operated by an operator. The forward/rearward travel lever sensor 52 is a sensor for detecting which travel is instructed by an operator either the forward travel or the rearward travel. The shift-up/shift-down sensor 53 is a sensor for detecting which button is operated by an operator either the shift-up button or the shift-down button. The gear stage, instructed by an operator, is thus detected. As illustrated in FIG. 2, the hydraulic sensor 54 includes a sensor 54a, a sensor 54b, a sensor 54c and a sensor 54d. The sensor 54a detects the hydraulic pressure to be supplied to the right travel unit 4 in the forward travel. The sensor 54b detects the hydraulic pressure to be supplied to the left travel unit 3 in the forward travel. The sensor 54c detects the hydraulic pressure to be supplied to the right travel unit 4 in the rearward travel. The sensor 54d detects the hydraulic pressure to be supplied to the left travel unit 3 in the rearward travel.

Controller

The controller 50 includes a vehicle speed/engine speed setting section 60, a differential pressure calculation section 61, a stall prevention control section 62, a vehicle speed selection section 63, a pump and motor displacement control section 64, a pump control section 65, a motor control section 66 and a steering control section 67.

Vehicle Speed/Engine Speed Setting Section 60

Figure 4:
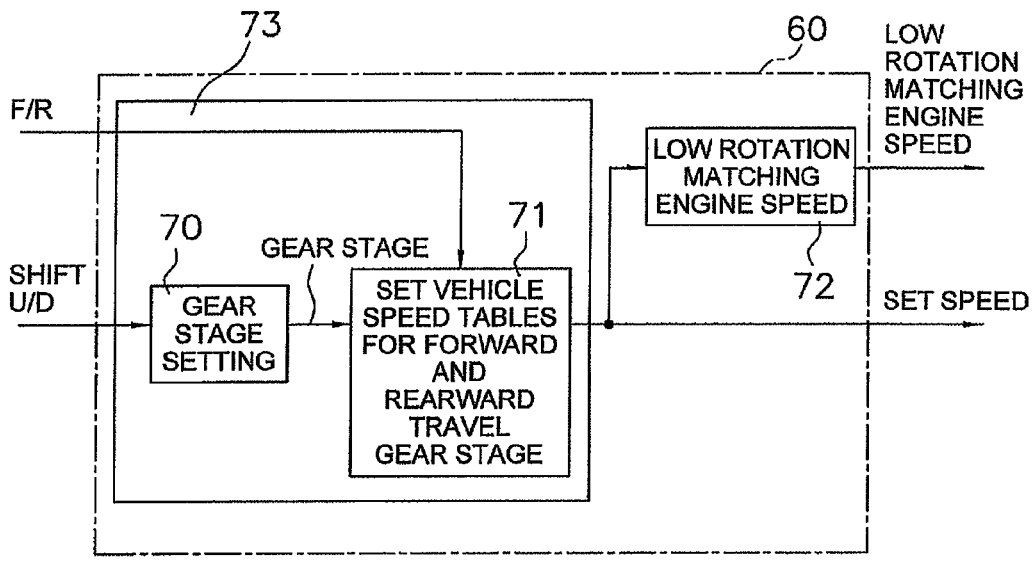
FIG. 4 is a functional block diagram of a vehicle speed/engine speed setting section.

FIG. 4 illustrates the vehicle speed/engine speed setting section 60 in detail. The vehicle speed/engine speed setting section 60 includes a vehicle speed setting section 73 and a low rotation matching engine speed setting section 72. The vehicle speed setting section 73 includes a gear stage setting section 70 and a gear stage and vehicle speed correspondence section 71. The vehicle speed setting section 73 is a section configured to set the vehicle speed in accordance with an instructed gear stage. Further, the low rotation matching engine speed setting section 72 is a section configured to set the engine speed to a predetermined partial engine speed when the set vehicle speed is in a preliminarily set low and intermediate speed range.

The gear stage setting section 70 is a section configured to set the gear stage in response to the signal inputted thereto from the shift-up/shift-down button sensor 53. A shift mode for allowing a quick gear shifting (e.g., three-stage gear shifting is available) and a shift mode for allowing a minute gear shifting (e.g., 19-stage gear shifting is available) are herein set for the vehicle of the present exemplary embodiment, although detailed explanation thereof will be hereinafter omitted. Therefore, the gear stage is herein configured to be set in accordance with the shift mode and the operator's setting for the shift buttons.

The gear stage and vehicle speed correspondence section 71 is a section storing a table indicating the correspondence between the gear stage and the set vehicle speed. Therefore, it is herein possible to obtain a vehicle speed (i.e., the maximum vehicle speed at a set gear stage) corresponding to a gear stage set in the gear stage setting section 70. It should be noted that the gear stage and vehicle speed correspondence section 71 separately storing a table for the forward travel and a table for the rearward travel.

The low rotation matching engine speed setting section 72 is a section configured to set the upper limit of the engine speed to a low matching engine speed lower than a high idle engine speed when the vehicle speed set in the gear stage and vehicle speed correspondence section 71 is in the preliminarily set low and intermediate speed range. This is specifically represented in an exemplary case of FIG. 5 with a characteristic Et. Even if an operator sets the engine speed to be the high idle engine speed (2270 rpm: full mode operation) by operating the fuel regulation lever (or the fuel regulation dial), an engine control signal is configured to be outputted for rotating the engine at an engine speed (i.e., 1900 rpm: partial engine speed) lower than the high idle engine speed when the operator's set vehicle speed is in the range of 0-7.8 km/h. By contrast, an engine control signal is configured to be outputted for increasing the engine speed up to the high idle engine speed in proportion to increase in the set vehicle speed when the set vehicle speed is in the high speed range equal to or greater than 7.8 km/h.

Figure 5:
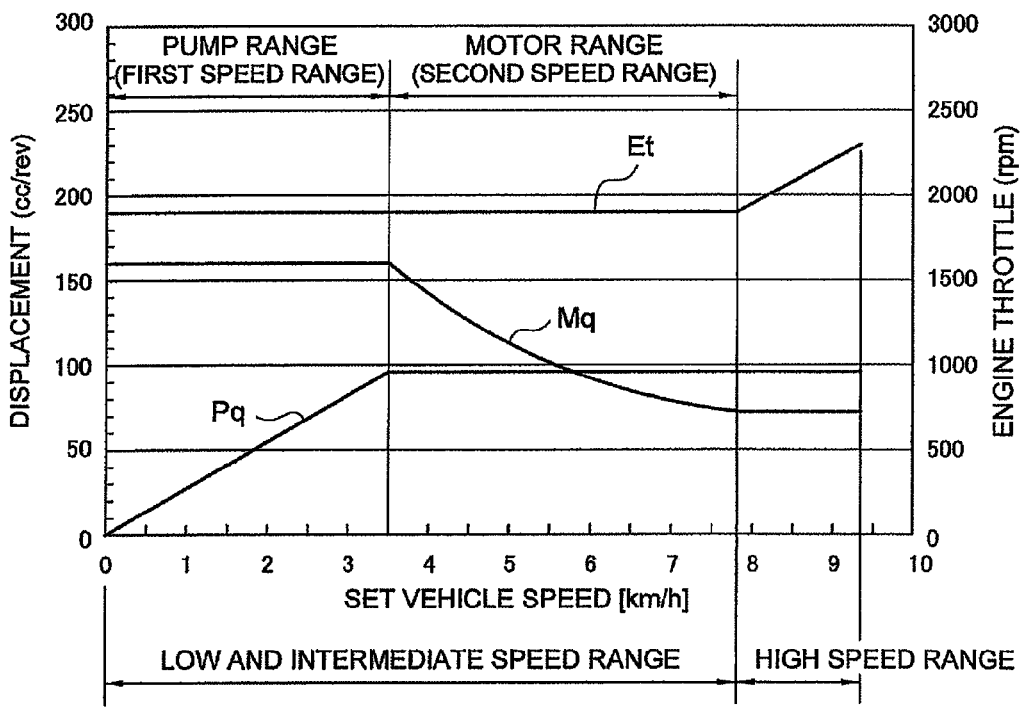
FIG. 5 is a chart representing the engine speed, the pump displacement and the motor displacement in a low rotation matching processing.

It should be noted that FIG. 5 represents the table stored in the low rotation matching engine speed setting section 72 and a table stored in the pump and motor displacement control section 64 to be described in a superimposed manner.

Differential Pressure Calculation Section 61

The differential pressure calculation section 61 is firstly configured to calculate a differential pressure based on a logic represented in FIG. 6 using results detected by the forward/rearward travel lever sensor 52 and the respective hydraulic sensors 54a to 54d as follows.

(a) When the forward/rearward travel lever is set to be in either the forward travel position or the neutral position:

(a-1) Left front-rear differential pressure ($\Delta P_L$)=Left front pressure (P54b)—Left rear pressure (P54d)

(a-2) Right front-rear differential pressure ($\Delta P_R$)=Right front pressure (P54a)—Right rear pressure (P54c)

(b) When the forward/rearward travel lever is set to be in the rearward travel position:

(b-1) Left front-rear differential pressure ($\Delta P_L$)=Left rear pressure (P54d)—Left front pressure (P54b)

(b-2) Right front-rear differential pressure ($\Delta P_R$)=Right rear pressure (P54c)—Right front pressure (P54a)

It should be noted that the term "left" in the term "left front-rear differential pressure" refers to a hydraulic circuit for driving the left travel unit 3, whereas the term "right" in the term "right front-rear differential pressure" refers to a hydraulic circuit for driving the right travel unit 4. Further, the term "front" in the above terms refers to a side of the hydraulic circuit that the hydraulic pressure is supplied in the forward travel, whereas the term "rear" in the above terms refers to a side of the hydraulic circuit that the hydraulic pressure is supplied in the rearward travel.

Further, the differential pressure calculation section 61 is configured to calculate a vehicle speed limit setting differential pressure ($\Delta P$) based on the following equation (Math. 1) using the left front-rear differential pressure ($\Delta P_L$), the right front-rear differential pressure ($\Delta P_R$) and a result detected by the steering lever sensor 51.

$$\Delta P = (\Delta P_L \times ST_L + \Delta P_R \times ST_R)/2 \quad \text{(Math. 1)}$$

Specifically, the differential pressure calculation section 61 is configured to respectively weight the left front-rear differential pressure ($\Delta P_L$) (i.e., the differential pressure between the left front hydraulic sensor 54b and the left rear hydraulic sensor 54d) and the right front-rear differential pressure ($\Delta P_R$) (i.e., the differential pressure between the right front hydraulic sensor 54a and the right rear hydraulic sensor 54c) with the result detected by the steering lever sensor 51. Further, the differential pressure calculation section 61 is configured to calculate average of the weighted left front-rear differential pressure and the weighted right front-rear differential pressure. Accordingly, the obtained average is set as the vehicle speed limit setting differential pressure ($\Delta P$).

In the above equation, $ST_L$ is a command value related to the leftward tilt of the steering lever. $ST_L$ is −100% when the steering lever is maximally tilted leftwards, whereas $ST_L$ is 100% when the steering lever is set to be in the neutral position. On the other hand, $ST_R$ is a command value related to the rightward tilt of the steering lever. $ST_R$ is −100% when the steering lever is maximally tilted rightwards, whereas $ST_R$ is 100% when the steering lever is set to be in the neutral position.

Seen from an operator, the steering lever is herein allowed to be tilted both rightwards and leftwards about the neutral position. The neutral position herein corresponds to "straight travel" of a work vehicle 1. A leftward tilt corresponds to "left turn" of the work vehicle 1, whereas a rightward tilt corresponds to "right turn" of the work vehicle 1.

When the steering lever is positioned in the neutral position (i.e., an operation stroke is 0%), a left steering command for the left crawler belt 3a is 100% and a right steering command for the right crawler belt 4a is also 100%. The right steering command for the right crawler belt 4a is reduced in proportion to increase in the rightward operation stroke of the steering lever. Likewise, the left steering command for the left crawler belt 3a is reduced in proportion to increase in the leftward operation stroke of the steering lever. A detection electric signal, indicating the rightward/leftward operation stroke detected by the steering lever sensor 51, is inputted into the steering control section 67. Accordingly, the following control will be executed.

First, right turning will be explained.

The right steering command $ST_R$ is reduced from 100% to −100% (i.e., rightward full stroke) in proportion to increase in the rightward operation stroke of the lever. On the other hand, the left steering command $ST_L$ is herein kept to be 100%.

When the right steering command $ST_R$ is in the range of 100% to 0%, the right crawler belt 4a and the left crawler belt 3a circulate in the same direction and turning is executed in accordance with a ratio of the right steering command $ST_R$ with respect to the left steering command $ST_L$ of 100%. When the right steering commands $ST_R$ of 80% and 30% are compared, for instance, the turning radius for the right steering command $ST_R$ of 80% is greater than that for the right steering command $ST_R$ of 30%.

When the right steering command $ST_R$ is 0%, a right pivot turning is executed. Simply put, the right crawler belt 4a stops circulating while only the left crawler belt 3a circulates at 100%.

When the right steering command $ST_R$ is −100% (rightward full stroke), on the other hand, a spin turning is executed. Simply put, the right crawler belt 4a and the left crawler belt 3a circulate in opposite directions at the same circulation speed.

Likewise, left turning is executed. Specifically, the left steering command $ST_L$ is reduced from 100% to −100% (leftward full stroke) in proportion to increase in the leftward operation stroke of the lever. On the other hand, the right steering command $ST_R$ is kept to be 100%.

When the left steering command $ST_L$ is in the range of 100% to 0%, the left crawler belt 3a and the right crawler belt 4a circulate in the same direction and turning is executed in accordance with a ratio of the left steering command $ST_L$ with respect to the right steering command $ST_R$ of 100%. When the left steering commands $ST_L$ of 80% and 30% are compared, for instance, the turning radius for the left steering command $ST_L$ of 80% is greater than that for the left steering command $ST_L$ of 30%.

When the left steering command $ST_L$ is 0%, a left pivot turning is executed. Simply put, the left crawler belt 3a stops circulating while only the right crawler belt 4a circulates at 100%.

When the left steering command $ST_L$ is −100% (leftward full stroke), on the other hand, a spin turning is executed. Simply put, the left crawler belt 3a and the right crawler belt 4a circulate in opposite directions at the same circulation speed.

It should be noted that the steering commands $ST_R$ and $ST_L$ are outputted to the pump control section 65 to be described and are then converted into pump displacement ratios.

Stall Prevention Control Section 62

Figure 7:
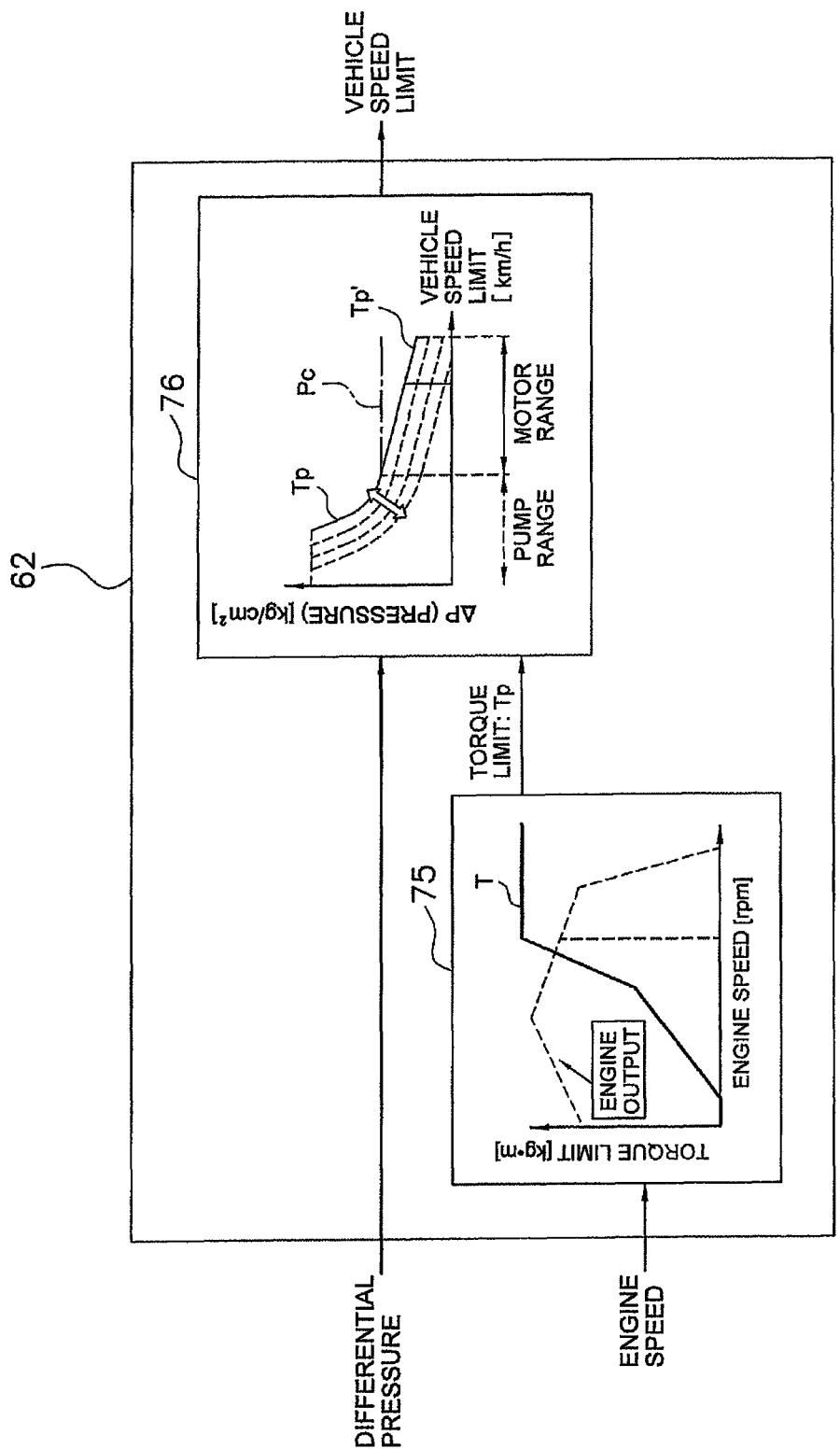
FIG. 7 is a functional block diagram of a vehicle speed limit setting section.

FIG. 7 illustrates the stall prevention control section 62 in detail. As illustrated in FIG. 7, the stall prevention control section 62 includes a torque limit setting section 75 for obtaining a torque limit from the engine speed and a vehicle speed limit setting section 76.

Figure 8:
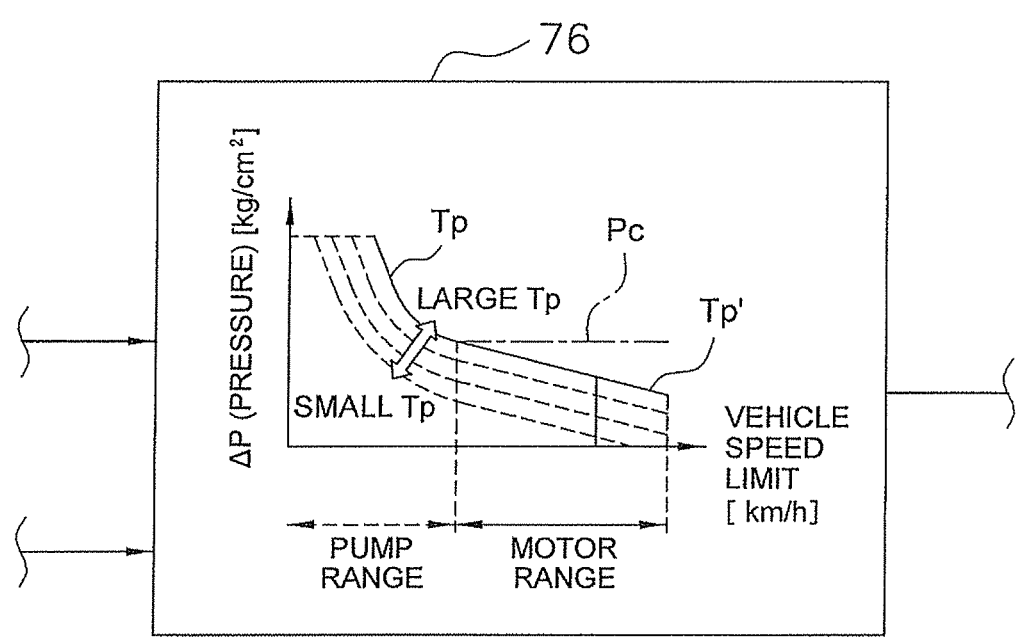
FIG. 8 is a functional block diagram of the vehicle speed limit setting section.

The vehicle speed limit setting section 76 illustrated in FIG. 7 herein stores a relation for obtaining the vehicle speed limit based on the torque limit Tp and the vehicle speed limit setting differential pressure $\Delta P$, as illustrated in FIG. 8. More specifically, the vehicle speed limit setting section 76 stores the relation that the vehicle speed limit is increased in proportion to increase in the torque limit Tp and the vehicle speed limit is reduced in proportion to reduction in the torque limit Tp even when the vehicle speed limit setting differential pressure $\Delta P$ is constant. In the chart representing the characteristic, a relatively low vehicle speed limit range corresponds to a pump range, whereas a relatively high speed limit range corresponds to a motor range.

The pump range is a range where the vehicle speed is changed by changing the pump displacement and keeping the motor displacement at a maximum level (see FIG. 5, details thereof will be described below). In the pump range, the pump displacement is controlled for constantly keeping the torque limit (i.e., the absorption toque of the hydrostatic transmission). In other words, the pump range is a range where the toque limit can be controlled by controlling the pump displacement.

The motor range is a range where the vehicle speed is changed by changing the motor displacement and keeping the pump displacement at a maximum level (see FIG. 5, details thereof will be described below). In the motor range, the torque limit is required to be controlled as depicted with a dashed dotted line Pc in the chart for keeping the torque limit constant. In executing such a control, however, the vehicle speed limit varies back and forth between minimum and maximum even when the vehicle speed limit setting differential pressure ΔP slightly varies. In other words, a hunting phenomenon occurs.

In response to the above, occurrence of the hunting phenomenon is prevented in the displacement control of the variable displacement hydraulic motor by setting a slope trend (i.e., a characteristic Tp') that the pressure is reduced in proportion to increase in the vehicle speed limit without keeping the pressure constant in the motor range.

Vehicle Speed Selection Section 63

The vehicle speed selection section 63 is configured to compare the set vehicle speed set by the vehicle speed/engine speed setting section 60 and the vehicle speed limit set by the stall prevention control section 62 (the vehicle speed limit setting section 76) and select the lower one of the above vehicle speeds as "a commanded vehicle speed".

Pump and Motor Displacement Control Section 64

Figure 9:
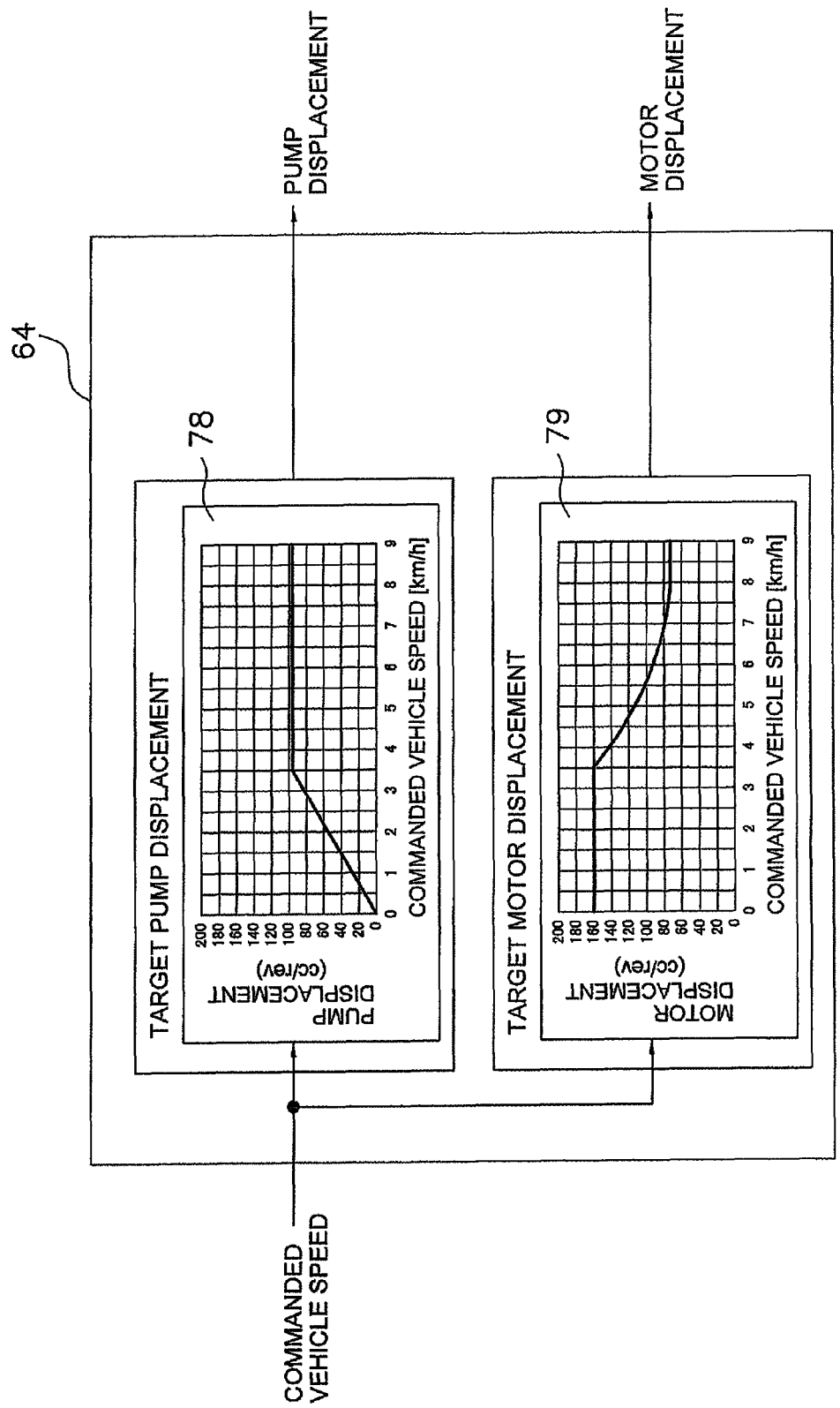
FIG. 9 is a functional block diagram of a pump and motor displacement control section.

FIG. 9 illustrates the pump and motor displacement control section 64 in detail. The pump and motor displacement control section 64 includes a pump displacement setting section 78 and a motor displacement setting section 79. The pump displacement setting section 78 stores a table of values of displacement of the variable displacement pump (hereinafter simply referred to as "pump displacement") corresponding to the respective commanded vehicle speeds selected by the vehicle speed selection section 63, whereas the motor displacement setting section 79 stores a table of values of displacement of the variable displacement hydraulic motor (hereinafter simply referred to as "motor displacement") corresponding to the respective commanded vehicle speeds selected by the vehicle speed selection section 63. Then, the pump displacement setting section 78 is configured to set the pump displacement in accordance with the vehicle speed selected by the vehicle speed selection section 63, whereas the motor displacement setting section 79 is configured to set the motor displacement in accordance with the vehicle speed selected by the vehicle speed selection section 63. Specifically, the pump displacement setting section 78 is configured to increase the pump displacement in proportion to increase in the commanded vehicle speed until the pump displacement is maximized, i.e., until the commanded vehicle speed reaches, for instance, 3.5 km/h. Further, the pump displacement setting section 78 is configured to keep the pump displacement constant after the pump displacement reaches the maximum displacement. On the other hand, the motor displacement setting section 79 is configured to keep the motor displacement constant until the pump displacement is maximized, i.e., until the commanded vehicle speed reaches, for instance, 3.5 km/h. Further, the motor displacement setting section 79 is configured to gradually reduce the motor displacement in proportion to increase in the commanded vehicle speed after the pump displacement reaches the maximum displacement. Displacement control signals are configured to be outputted for executing the aforementioned controls of the variable displacement pump and the variable displacement hydraulic motor.

In the present exemplary embodiment, the table of pump displacement versus commanded vehicle speed in the pump displacement setting section 78 and the table of motor displacement versus commanded vehicle speed in the motor displacement setting section 79 are herein set for allowing the vehicle speed to reach the vehicle speed set by the vehicle speed setting section 73 even when the engine is rotated at the partial engine speed.

As described above, FIG. 5 represents the table in the low rotation matching engine speed setting section 72 and the table in the pump and motor displacement control section 64 to be described in a superimposed manner. In FIG. 5, a pump displacement Pq and a motor displacement Mq are set for obtaining the set vehicle speed when the engine is rotated at the partial engine speed (1900 rpm) in the low and intermediate speed range. A part of the low and intermediate speed range with a relatively low set vehicle speed corresponds to a pump range that the vehicle speed is changed by changing the pump displacement with keeping the motor displacement at the maximum level. On the other hand, the other part of the low and intermediate speed range with a relatively high set vehicle speed corresponds to a motor range that the vehicle speed is changed by changing the motor displacement with keeping the pump displacement at the maximum level. The pump range and the motor range in FIG. 5 respectively correspond to the pump range and the motor range in FIG. 8.

The high speed range is a range that the vehicle speed cannot reach the set vehicle speed by controlling the variable displacement pump and the variable displacement hydraulic motor. In response to this, the vehicle speed is changed by controlling the engine speed in the high speed range, as described above. Specifically, the engine speed is increased to the high idle engine speed in proportion to increase in the set vehicle speed Pump Control Section 65

The pump control section 65 is configured to convert a pump displacement command outputted from the pump and motor displacement control section 64 into an electric command by adding commands of the right/left steering lever and the forward/rearward travel lever thereto, and is then configured to output the electric command as a control command to the left pump swash plate drive unit 23 and the right pump swash plate drive unit 24.

Motor Control Section 66

The motor control section 66 is configured to convert a motor displacement command outputted from the pump and motor displacement control section 64 into an electric command and output the electric command as a control command to the left motor swash plate drive unit 32 and the right motor swash plate drive unit 33.

Steering Control Section

Figure 10:
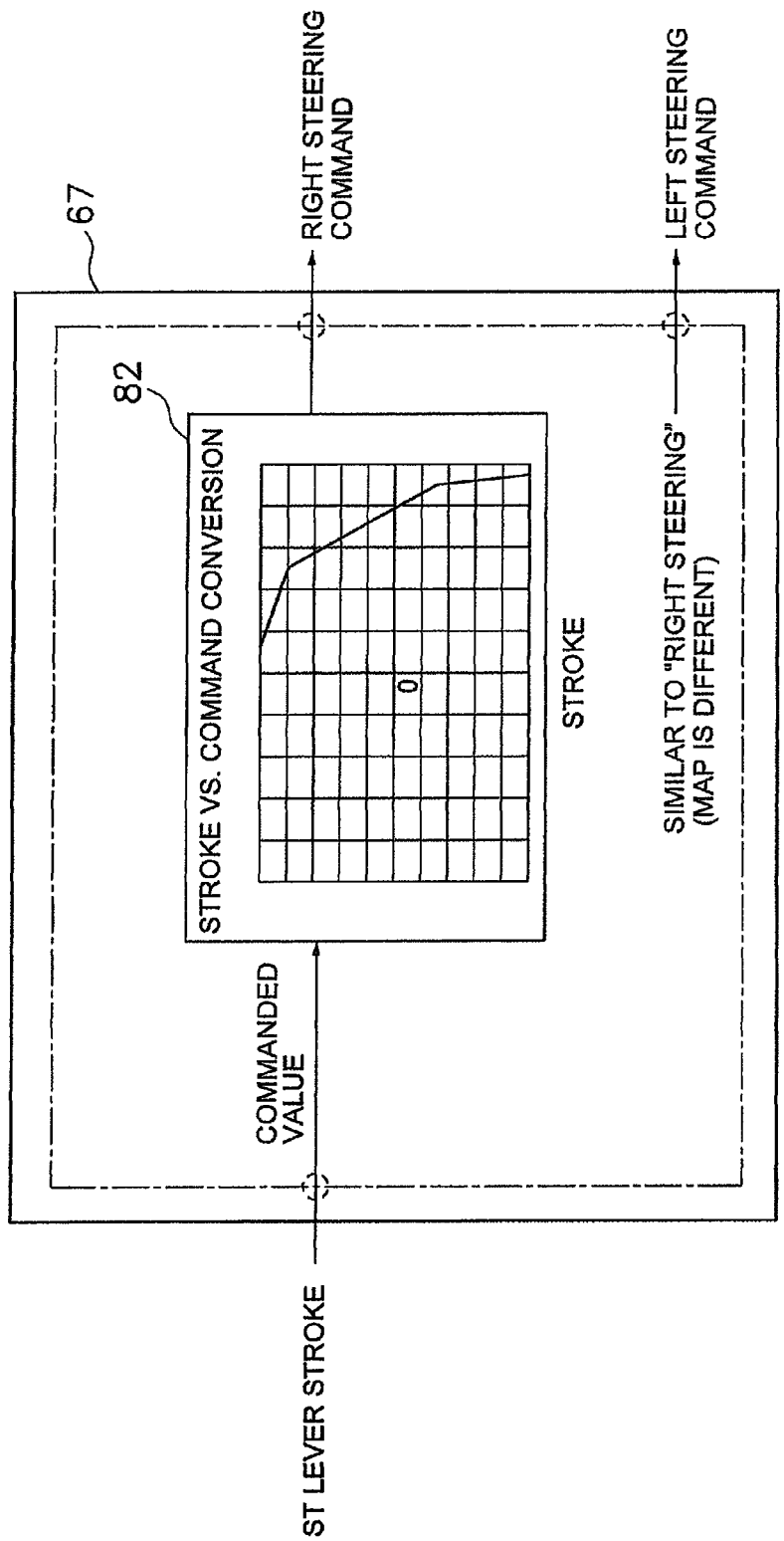
FIG. 10 is a functional block diagram of a steering control section.
Figure 11:
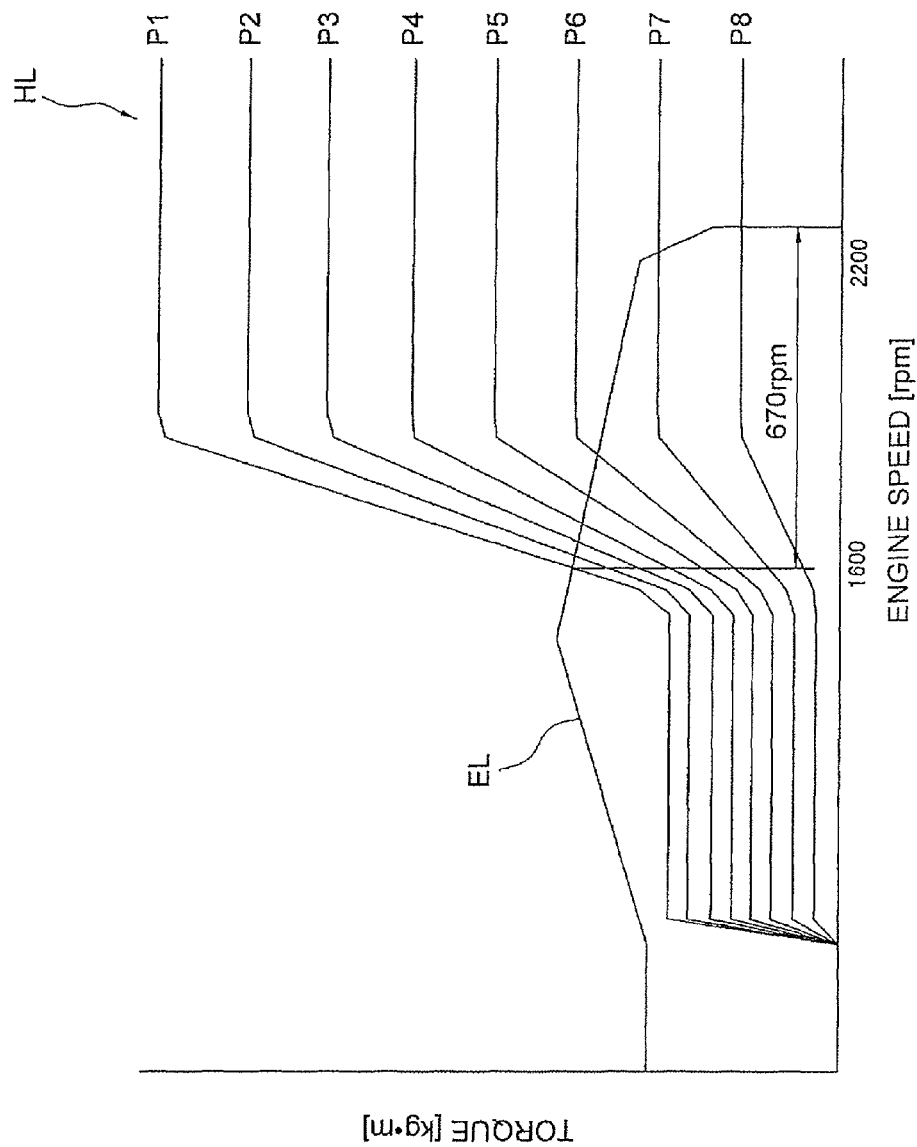
FIG. 11 is a chart representing an engine output torque characteristic and an HST torque limit characteristic in the well-known bulldozers.

FIG. 10 illustrates the steering control section 67 in detail. The steering control section 67 is a section configured to convert the lever stroke detected by the steering lever sensor 51 into a right/left steering command. The steering control section 67 includes a conversion table 82 indicating the correspondence between the lever stroke and the command value as illustrated in FIG. 10. It should be noted that FIG. 10 represents the relation between a steering lever stroke and a right steering command. However, the basic configuration for the conversion in the relation between the steering lever stroke and the right steering command is similar to that in the relation between a steering lever stroke and a left steering command, although the tables (i.e., maps) for the relations are different from each other only due to their bilateral symmetry.

Control Processing

Next, a control processing to be executed by the controller 50 will be explained with reference to FIGS. 3 to 7.

Low Rotation Matching Processing

First, a low rotation matching processing to be executed by the controller 50 will be explained. The low rotation matching processing is a processing of operating the bulldozer by automatically setting the engine speed to the partial engine speed when the commanded vehicle speed is in the low and intermediate speed range in consideration of the current usage condition of the bulldozer. It should be noted that the pump and motor displacements are controlled in consideration of the torque limit as well in the actual control processing. For the sake of simple explanation, the control in consideration of only the low rotation matching will be herein firstly explained.

The low rotation matching processing is mainly executed by the vehicle speed/engine speed setting section 60 and the pump and motor displacement control section 64. Specifically, when receiving either a shift-up instruction or a shift-down instruction from an operator, the gear stage setting section 70 is configured to set the gear stage in response to the received instruction. Subsequently, the gear stage and vehicle speed correspondence section 71 is configured to set the set vehicle speed corresponding to the set gear stage. It should be noted that the set vehicle speed is set using the forward-travel table in the forward travel and is set using the rearward-travel table in the rearward travel.

When the gear stage and vehicle speed correspondence section 71 sets the vehicle speed, the low rotation matching engine speed setting section 72 is configured to set the engine speed based on the set vehicle speed. As described above, the table (the characteristic Et) represented in FIG. 5 is preliminarily provided for the low rotation matching engine speed setting section 72. Therefore, the engine speed is set to 1900 rpm as the partial engine speed when the set vehicle speed is in the preliminarily set low and intermediate speed range. Even when an operator herein sets the engine speed to the high idle engine speed, the engine speed is configured to be automatically set to the partial engine speed.

As described above, the pump displacement Pq and the motor displacement Mq are set for achieving the set vehicle speed when the engine is rotated at the partial engine speed (i.e., 1900 rpm) in the low and intermediate speed range. In the high speed range, by contrast, the engine speed is controlled for achieving the set vehicle speed.

Even if an operator thus sets the engine speed to the high idle engine speed, the engine speed is automatically limited to the partial engine speed when the set vehicle speed is in the low and intermediate speed range. Therefore, low fuel consumption can be achieved. By contrast, a required vehicle speed is achieved by controlling the engine speed when the set vehicle speed is in the high speed range. Therefore, the maximum vehicle speed is prevented from being lowered than the maximum vehicle speeds of the well-known bulldozers. Overall, even if an operator operates the bulldozer at the high idle engine speed, the fuel efficiency of the bulldozer can be better than the fuel efficiencies of the well-known bulldozers while the maximum vehicle speed can be achieved on roughly the same level as the maximum vehicle speeds of the well-known bulldozers.

Torque Control Processing

In the pump and motor displacement controls of the well-known bulldozers, the engine speed, allowing matching between the engine output torque characteristic and the torque limit characteristic of the hydrostatic transmission, widely varies in response to variation in pressure under load as described above. This is not preferable for executing the low rotation matching processing.

Figure 12:
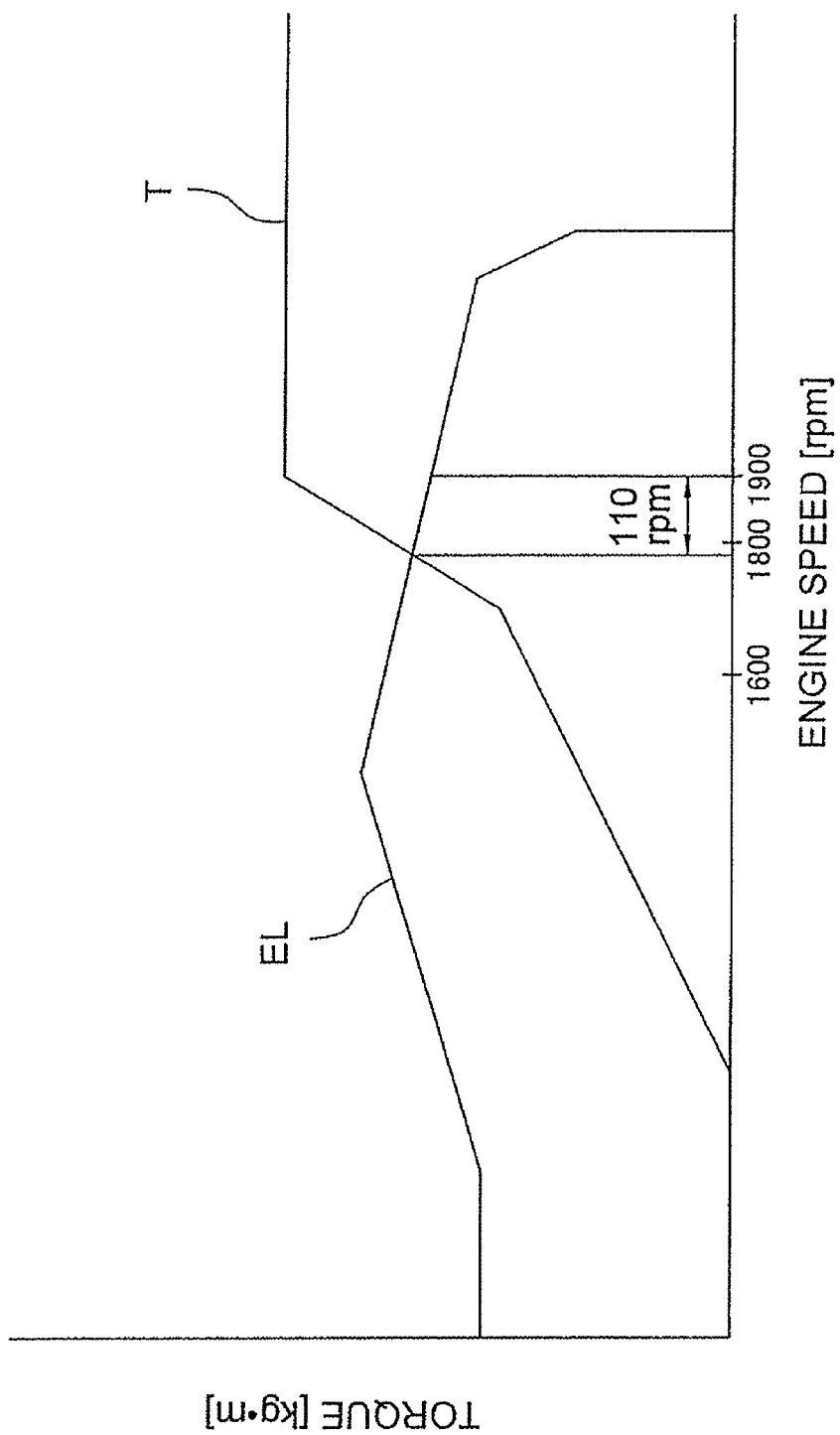
FIG. 12 is a chart representing an engine output torque characteristic and an HST torque limit characteristic in the bulldozer adopting the exemplary embodiment of the present invention.

In response to this, the torque control is executed and the torque limit is set based on the engine speed in the present exemplary embodiment, as explained in the above paragraphs of the stall prevention control section 62. As represented in FIG. 12, a torque limit characteristic T can be represented by a single line of characteristic by executing the torque control. Even when the low rotation matching processing is herein executed, variation in the matching engine speed can be limited to be in a range of, for instance, roughly 110 rpm.

In executing the torque control, the differential pressure calculation section 61 is firstly configured to calculate the left front-rear differential pressure and the right font-rear differential pressure. This has been described in detail in the paragraphs explaining the differential pressure calculation section 61.

The stall prevention control section 62 is configured to set the vehicle speed limit based on the differential pressure calculated by the differential pressure calculation section 61 and the engine speed. This has been described in detail in the paragraphs explaining the stall prevention control section 62.

When the vehicle speed limit is set, the vehicle speed selection section 63 is configured to compare the vehicle speed limit herein set and the aforementioned set vehicle speed set by the vehicle speed/engine speed setting section 60 and select a lower one of the vehicle speeds.

Next, the pump and motor displacement control section 64 is configured to set the pump displacement and the motor displacement based on the vehicle speed selected by the vehicle speed selection section 63. Specifically, in response to the vehicle speed set by the vehicle speed selection section 63, the pump displacement setting section 78 is configured to set the pump displacement, whereas the motor displacement setting section 79 is configured to set the motor displacement.

The pump control section 65 is configured to add a command from the steering lever sensor 51 and a command from the forward/rearward travel lever sensor 52 to the pump displacement set as described above and convert the pump displacement with addition of the commands into an electric command. The pump control section 65 is configured to output the electric command as a control signal to the left pump swash plate drive unit 23 of the left variable displacement pump 21 and the right pump swash plate drive unit 24 of the right variable displacement pump 22. On the other hand, the motor control section 66 is configured to convert the motor displacement into an electric command and output the electric command as a control signal to the left motor swash plate drive unit 32 of the left variable displacement hydraulic motor 30 and the right motor swash plate drive unit 33 of the right variable displacement hydraulic motor 31.

Therefore, even if the bulldozer is operated at the high idle engine speed, the engine speed is automatically limited to the partial engine speed when the commanded vehicle speed (i.e., the set vehicle speed or the vehicle speed limit) is in the low and intermediate speed range. Accordingly, low fuel consumption can be achieved. By contrast, a required vehicle speed can be achieved by controlling the engine speed when the set vehicle speed is in the high speed range. Therefore, the maximum vehicle speed is prevented from being lowered than the maximum vehicle speeds of the well-known bulldozers. Overall, even if an operator operates the bulldozer at the high idle engine speed, the fuel efficiency of the bulldozer can be better than the fuel efficiencies of the well-known bulldozers while the maximum vehicle speed can be achieved on roughly the same level as the maximum vehicle speeds of the well-known bulldozers.

Features of First Exemplary Embodiment (1) Even if instructed to be operated at the high idle engine speed by an operator, the bulldozer is automatically operated at the predetermined partial engine speed by the low rotation matching processing when the commanded vehicle speed is in the preliminarily set low and intermediate speed range. Therefore, reduction in fuel consumption and reduction in noises can be achieved without making an operator execute bothersome operations such as switching of operation modes.

Further, both the pump displacement and the motor displacement are set for achieving the set vehicle speed when the engine is rotated at the partial engine speed in the low and intermediate speed range. Therefore, the vehicle speed can reach the operator's desired vehicle speed even when the engine speed is low.

(2) In executing the low rotation matching processing, the engine speed is controlled and increased to the high idle engine speed when the commanded vehicle speed is high and the vehicle speed thereby cannot reach the commanded vehicle speed by controlling the pump displacement and the motor displacement. Therefore, the vehicle speed can reach the operator's desired vehicle speed without changing the hardware configuration, i.e., without enlarging the variable displacement pump and the variable displacement hydraulic motor.

A fuel consumption reduction effect in the high speed range is herein lower than that in the low and intermediate speed range. However, frequency of using the bulldozers at the maximum vehicle speed is quite low especially in the normal usage conditions. Further, the bulldozer is herein configured to be operated at the partial engine speed in the high speed range at which the bulldozer is frequently used. Therefore, fuel efficiency can be improved in the entire usage conditions.

(3) In the present exemplary embodiment, the torque control is executed for preventing the matching engine speed from largely varying due to variation in load. Specifically, both the pump displacement and the motor displacement are set for keeping the matching engine speed constant. Therefore, this is preferable to execute the aforementioned low rotation matching processing.

(4) The torque limit is set in accordance with the engine speed and the respective displacements are controlled for allowing the matching engine speed to vary in a roughly constant range. Therefore, reduction in the engine output can be avoided even when the load varies.

(5) In the torque control, the vehicle speed limit is not set to be constant with respect to pressure after the pump displacement reaches the maximum displacement, i.e., in the motor range that the motor displacement is controlled. Therefore, occurrence of the hunting phenomenon can be prevented in the control of the motor displacement.

Control Blocks (Second Exemplary Embodiment)

Figure 13:
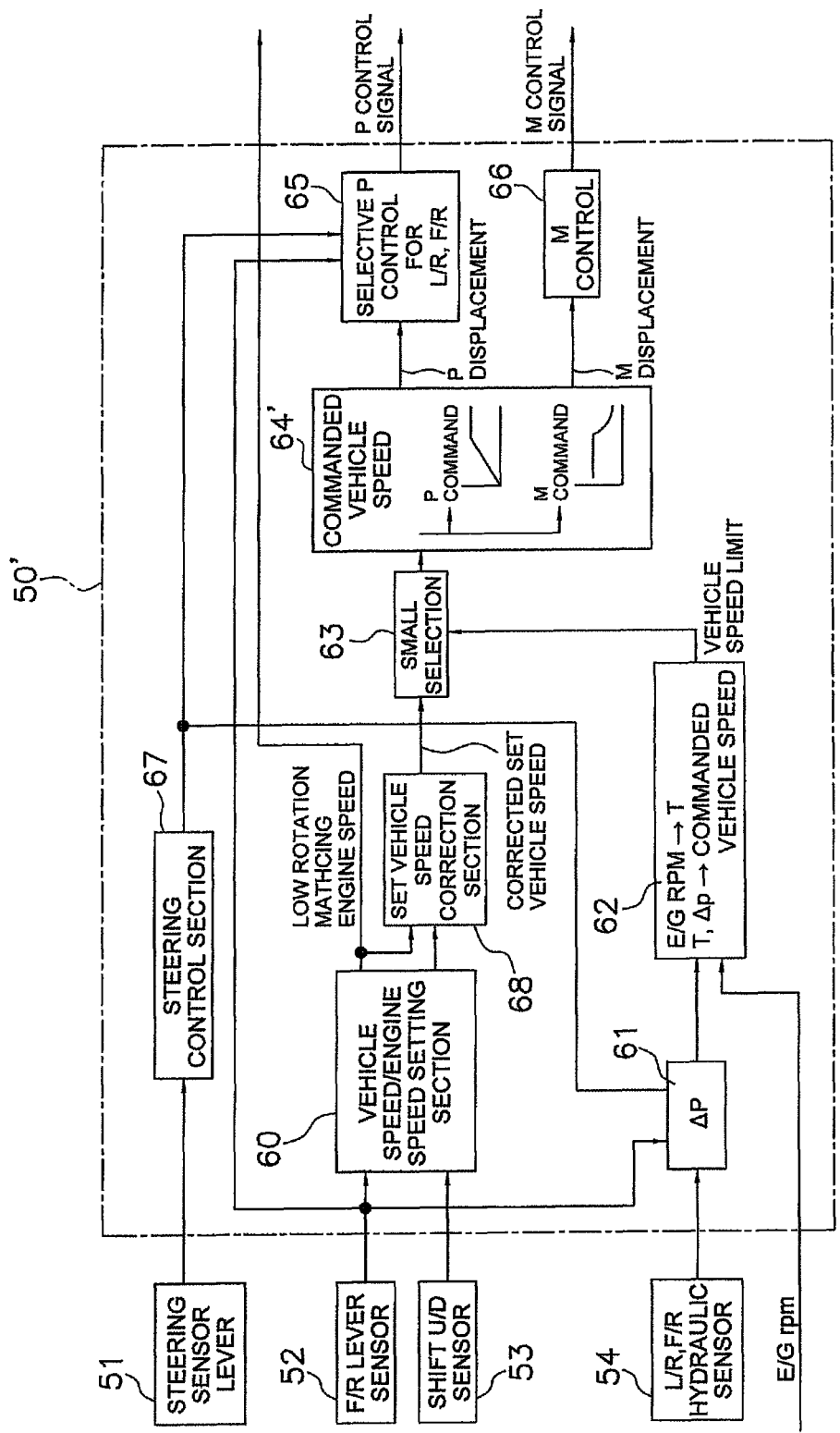
FIG. 13 is a functional block diagram of a controller according to a second exemplary embodiment.

FIG. 13 illustrates a control block diagram of a controller 50' of the present vehicle according to a second exemplary embodiment of the present invention. In the second exemplary embodiment, only differences from the first exemplary embodiment will be described. The same reference numerals will be assigned to the same components as those of the first exemplary embodiment, and explanation thereof will be hereinafter omitted.

In the second exemplary embodiment, a set vehicle speed correction section 68 is provided between the vehicle speed/engine speed setting section 60 and the vehicle speed selection section 63. Further, tables of values of the pump and motor displacements with respect to the commanded vehicle speed in a pump and motor displacement control section 64' are different from those in the first exemplary embodiment. Except for the difference of the tables, the pump and motor displacement control section 64' is the same as the pump and motor displacement control section 64 in the first exemplary embodiment. In the present exemplary embodiment, the low rotation matching processing is mainly executed by the vehicle speed/engine speed setting section 60 and the set vehicle speed correction section 68.

The set vehicle speed correction section 68 is configured to correct the set vehicle speed by the high idle engine speed for allowing the vehicle speed to reach the set vehicle speed obtained by the vehicle speed setting section 73 when the engine is rotated at the partial engine speed. The set vehicle speed correction section 68 is then configured to output the corrected set vehicle speed to the pump and motor displacement control section 64'. More specifically, the set vehicle speed correction section 68 is configured to calculate a corrected set vehicle speed based on the following equation (Math. 2) using the set vehicle speed set by the vehicle speed setting section 73 and the low rotation matching engine speed.

Corrected set vehicle speed=Set vehicle speed×(High idle engine speed/Low rotation matching engine speed) (Math. 2)

The vehicle speed selection section 63 is configured to compare the corrected set vehicle speed calculated by the set vehicle speed correction section 68 and the vehicle speed limit obtained by the stall prevention control section 62 (the vehicle speed limit setting section 76) and is configured to select the lower one of the above vehicle speeds as "a commanded vehicle speed".

Figure 14:
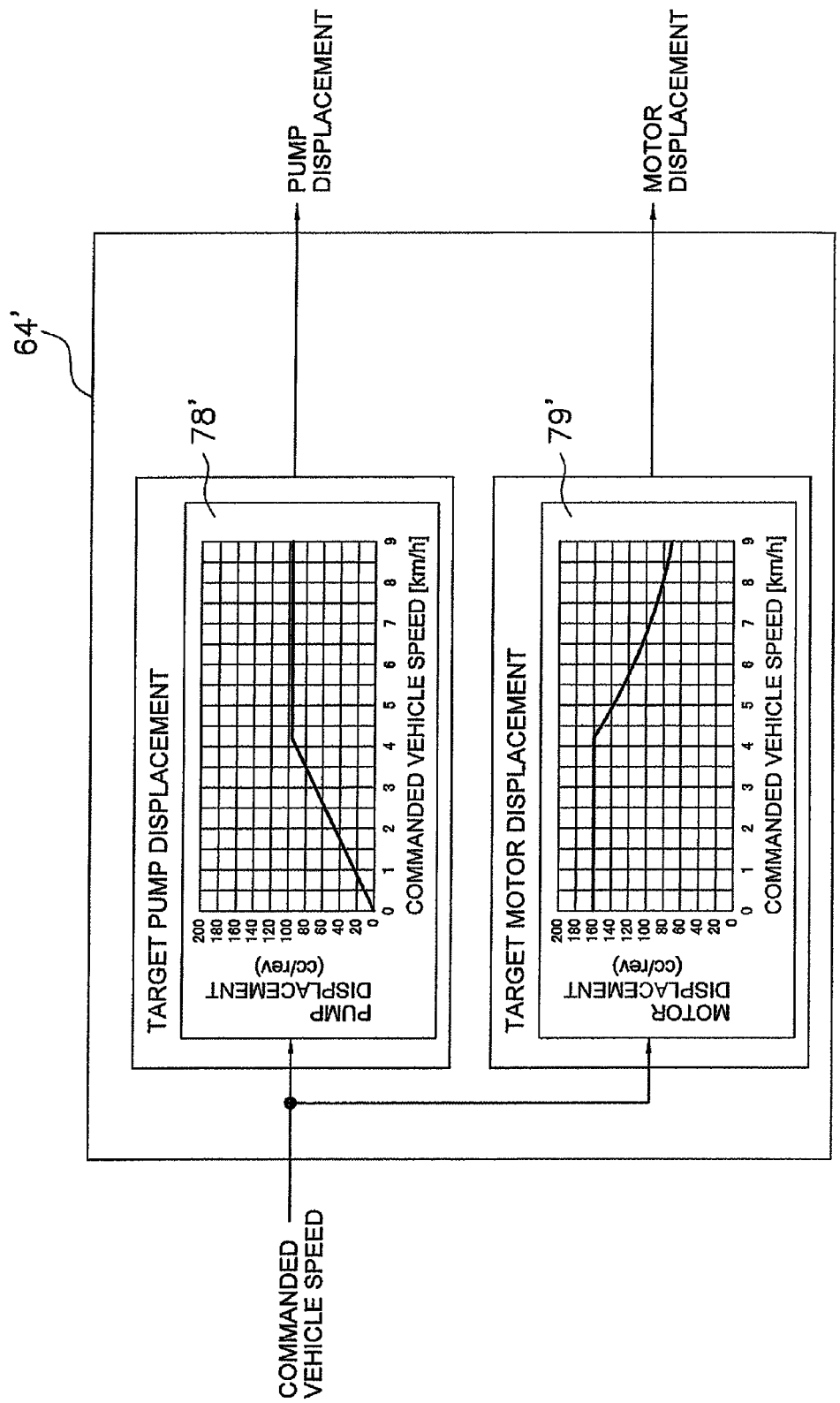
FIG. 14 is a functional block diagram of a pump and motor displacement control section according to the second exemplary embodiment.

As illustrated in FIG. 14, the pump and motor displacement control section 64' includes a pump displacement setting section 78' and a motor displacement setting section 79'. Tables of the pump displacement and the motor displacement with respect to the commanded vehicle speed, stored in the pump displacement setting section 78' and the motor displacement setting section 79', preliminarily store a correspondence of the displacement of the variable displacement pump versus the set vehicle speed and a correspondence of the displacement of the variable displacement hydraulic motor versus the set vehicle speed, respectively, for allowing the vehicle speed to reach the set vehicle speed set by the vehicle speed setting section 73 when the engine is rotated at the high idle engine speed. In other words, the pump and motor displacement control section 64' in the second exemplary embodiment is the same as the pump and motor displacement control sections of the well-known bulldozers.

Features of Second Exemplary Embodiment

According to the present exemplary embodiment, advantageous effects similar to those of the first exemplary embodiment can be achieved without changing the pump and motor displacement control section of the well-known type.

Further, a plurality of maps is not herein required. Therefore, it is possible to easily cope with even such a case that the partial engine speed is required to be changed.

Control Blocks (Third Exemplary Embodiment)

Figure 15:
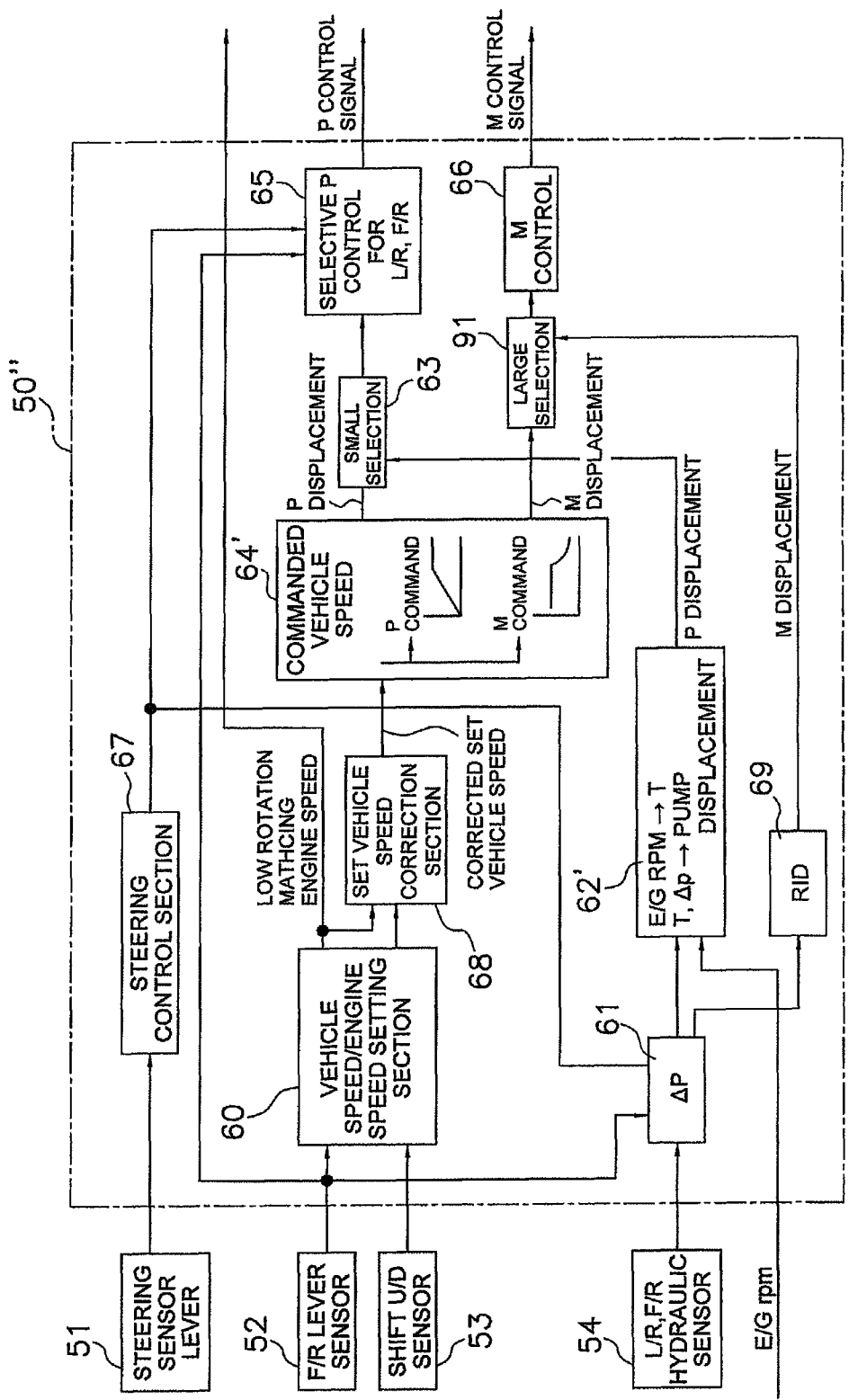
FIG. 15 is a functional block diagram of a controller according to a third exemplary embodiment.

FIG. 15 illustrates a control block diagram of a controller 50" of the present vehicle according to a third exemplary embodiment of the present invention. It should be noted that only the differences from the first and second exemplary embodiments will be hereinafter described. The same reference numerals will be assigned to the same components as those of the first and second exemplary embodiments, and explanation thereof will be hereinafter omitted.

In the third exemplary embodiment, the set vehicle speed correction section 68 is disposed between the vehicle speed/engine speed setting section 60 and the pump and motor displacement control section 64'. Further, the pump and motor displacement control section 64' stores a table similar to that stored in the second exemplary embodiment. The third exemplary embodiment is mainly different from the first and second exemplary embodiments in that the motor displacement is set through a PID control (proportional-integral-derivative control).

Specifically, the controller 50" includes a stall prevention control section 62', a motor displacement control section (PID control) 69, a pump displacement selection section 90 and a motor displacement selection section 91 as components different from those in the respective aforementioned exemplary embodiments.

Figure 16:
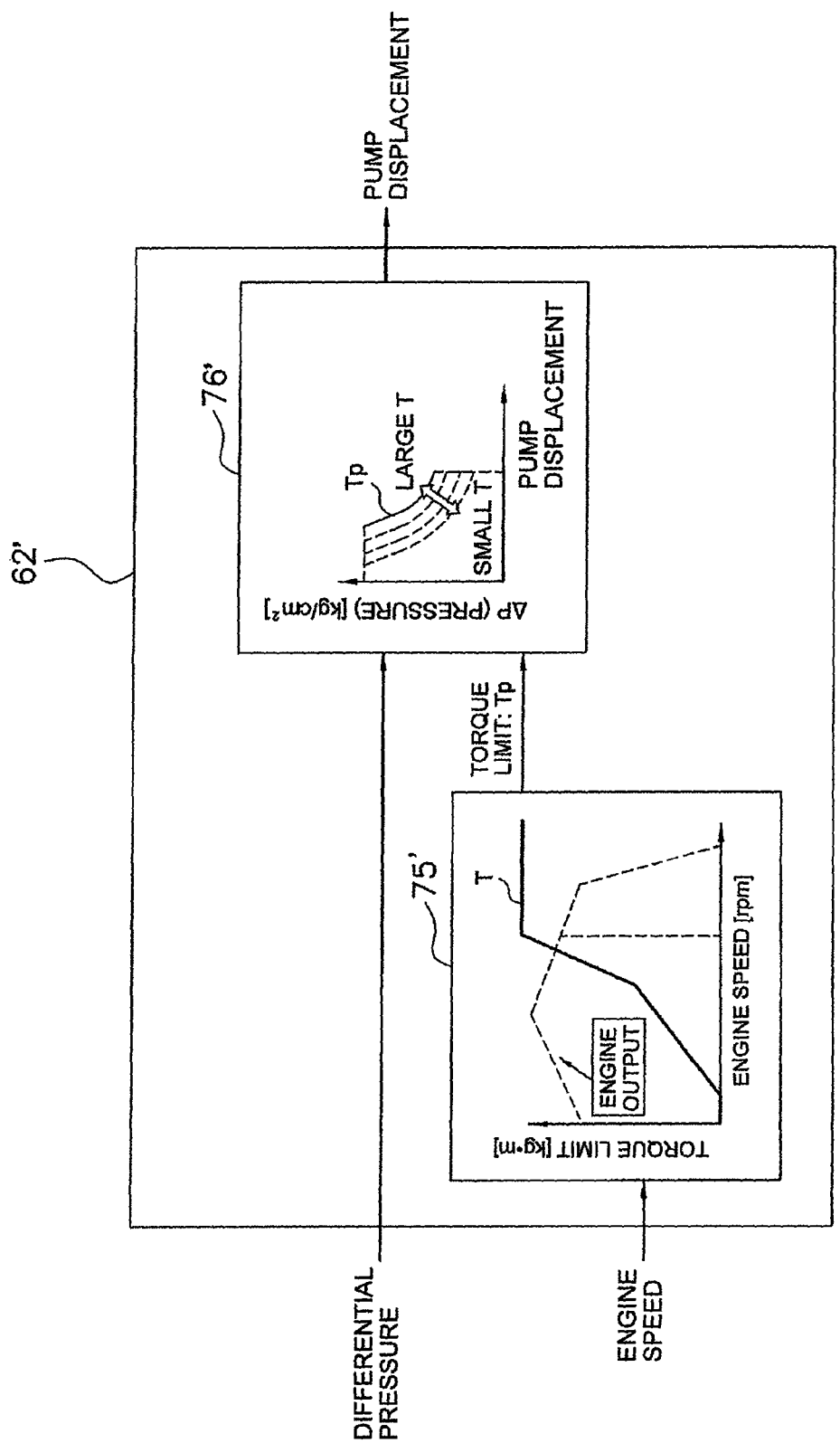
FIG. 16 is a functional block diagram of a stall prevention control section according to the third exemplary embodiment.

As illustrated in FIG. 16, the stall prevention control section 62' includes the torque limit setting section 75 for obtaining the torque limit based on the engine speed, and a torque control pump displacement setting section 76'. The configuration and the function of the torque limit setting section 75 are similar to those of the torque limit setting section 75 in the aforementioned respective exemplary embodiments. The torque limit setting section 75 is configured to set the torque limit, which is the maximum torque usable for the HST, in accordance with the engine speed. Further, the torque control pump displacement setting section 76' preliminarily stores the relation illustrated in FIG. 16 for obtaining the pump displacement based on the torque limit Tp and the pump displacement setting differential pressure ΔP. More specifically, the torque control pump displacement setting section 76' preliminarily stores the relation that the pump displacement is increased in proportion to increase in the torque limit Tp and the pump displacement is reduced in proportion to reduction in the torque limit Tp even when the differential pressure ΔP is constant. In the third exemplary embodiment, the stall prevention control section 62' is configured to set only the pump displacement based on the differential pressure and the engine speed (torque limit) and output the set pump displacement.

On the other hand, the motor displacement is set by the motor displacement control section 69. Specifically, a preliminarily fixed target pressure is set in the motor displacement control section 69. When the motor displacement control section 69 executes a PID control as a feedback control, the motor displacement is set for allowing the differential pressure to be obtained by the differential pressure calculation section 61 to be the target pressure.

The pump displacement selection section 90 is configured to compare the pump displacement set by the pump displacement setting section 78' of the pump and motor displacement control section 64' and the pump displacement set by the torque control pump displacement setting section 76' of the stall prevention control section 62'. The pump displacement selection section 90 is then configured to select the smaller one of the pump displacements and output the selected pump displacement.

Meanwhile, the motor displacement selection section 91 is configured to compare the motor displacement set by the motor displacement setting section 79' of the pump and motor displacement control section 64' and the motor displacement set by the motor displacement control section 69. The motor displacement selection section 91 is then configured to select the smaller one of the motor displacements and output the selected motor displacement.

Next, operations in the third exemplary embodiment will be explained.

The low rotation matching processing is similar to that explained in the first exemplary embodiment. Further, the processing of calculating the corrected set vehicle speed by correcting the set vehicle speed based on the aforementioned equation (Math. 2) is similar to that explained in the second exemplary embodiment.

The pump displacement is set based on the table stored in the pump displacement setting section 78' using the corrected set vehicle speed calculated as described above. On the other hand, the pump displacement is set by the torque control pump displacement setting section 76' of the stall prevention control section 62' using the torque limit Tp and the pump displacement setting differential pressure ΔP.

The smaller one of the two pump displacements set as described above is selected by the pump displacement selection section 90 and is transmitted to the pump control section 65. The subsequent processing steps are similar to those in the aforementioned respective exemplary embodiments.

Meanwhile, the motor displacement is set based on the table stored in the motor displacement setting section 79' using the corrected set vehicle speed. On the other hand, the motor displacement is obtained by the motor displacement control section 69 for allowing the differential pressure ΔP to be the target pressure.

Subsequently, the larger one of the two motor displacements set as described above is selected by the motor displacement selection section 91 and is transmitted to the motor control section 66. The subsequent processing steps are similar to those in the aforementioned respective exemplary embodiments.

Features of Third Exemplary Embodiment

According to the present exemplary embodiment, advantageous effects similar to those of the first exemplary embodiment can be achieved without changing the pump and motor displacement control section of the well-known type.

Further, the motor displacement is set by the PID control in setting the motor displacement for avoiding lack of power in working of the bulldozer. It is thereby possible to accurately and reliably set the motor displacement to be a desired displacement.

Yet further, the motor displacement is determined by the PID control. It is thereby possible to further reliably prevent occurrence of the hunting phenomenon than the first and second exemplary embodiments.

Other Exemplary Embodiments (a) In the vehicle speed limit setting section 76, the pressure is set to be reduced in proportion to increase in the vehicle speed limit in the range that the motor displacement is controlled. However, the pressure may be constant with respect to the vehicle speed limit. In this case, it is possible to substantially eliminate the variation range of the matching engine speed represented in FIG. 12.

(b) The partial engine speed, the high idle engine speed, the set vehicle speed and the commanded vehicle speed, described in the aforementioned exemplary embodiments, are only illustrative and values thereof are not necessarily limited to the aforementioned exemplary embodiments.

(c) In the third exemplary embodiment, the displacements including the pump displacement are set by correcting the set vehicle speed. However, the displacements may be respectively set using the pump and motor displacement control section 64 storing the table similar to that in the first exemplary embodiment without correcting the set vehicle speed.

According to the illustrated embodiments, as described above, it is possible to enhance a fuel efficiency of a vehicle equipped with a hydrostatic transmission than fuel efficiencies of the well-known vehicles with the hydrostatic transmissions without causing drawbacks such as reduction in the vehicle speed even when the hardware configuration of the vehicle is not changed.

The invention claimed is:

1. A control device for a hydrostatic transmission vehicle equipped with a hydrostatic transmission including a variable displacement pump to be driven by an engine and a variable displacement hydraulic motor to be rotated by a pressurized oil from the variable displacement pump, the control device comprising:

a vehicle speed setting section configured to set a set vehicle speed based on both a travel command and a gear stage command instructed by an operator, the set vehicle speed being a maximum vehicle speed corresponding to the travel command and the gear stage command;

a low rotation matching engine speed setting section storing a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range, the low rotation matching engine speed setting section being configured to set the upper limit of the engine speed using the set vehicle speed set by the vehicle speed setting section based on the correspondence;

a pump and motor displacement control section configured to control respective displacements of the variable displacement pump and the variable displacement hydraulic motor based on the set vehicle speed for allowing a vehicle speed to reach the set vehicle speed set by the vehicle speed setting section even when the engine is rotated at the partial engine speed;

a hydraulic sensor configured and arranged to detect a pressure in a hydraulic circuit including the variable displacement pump and the variable displacement hydraulic motor, a torque limit setting section configured to obtain the engine speed and set a torque limit usable for the hydrostatic transmission based on the obtained engine speed, a vehicle speed limit setting section configured to set a vehicle speed limit based on the detected pressure in the hydraulic circuit and the torque limit set by the torque limit setting section, and a vehicle speed selection section configured to select a lower one of the set vehicle speed set by the vehicle speed setting section and the vehicle speed limit set by the vehicle speed limit setting section, the pump and motor displacement control section being configured to execute the control using the vehicle speed selected by the vehicle speed selection section as the set vehicle speed.

2. The control device for a hydrostatic transmission vehicle recited in claim 1, wherein the pump and motor displacement control section is configured to execute a control of increasing the displacement of the variable displacement pump in proportion to increase in the set vehicle speed and keeping the displacement of the variable displacement hydraulic motor constant when the set vehicle speed is in a first speed range as a lower part of the low and intermediate speed range, and the pump and motor displacement control section is configured to execute a control of keeping the displacement of the variable displacement pump to a maximum displacement and reducing the displacement of the variable displacement hydraulic motor in proportion to increase in the set vehicle speed after the displacement of the variable displacement pump reaches the maximum displacement when the set vehicle speed is in a second speed range higher than the first speed range in the low and intermediate speed range.

3. The control device for a hydrostatic transmission vehicle recited in claim 1, wherein a high speed range is a speed range higher than the low and intermediate speed range, the high speed range being set as a range that the vehicle speed cannot reach the set vehicle speed set by the vehicle speed setting section by the controls of the variable displacement pump and the variable displacement hydraulic motor, and the low rotation matching engine speed setting section is configured to control and increase the engine speed from the partial engine speed to the high idle engine speed in proportion to increase in the set vehicle speed when the set vehicle speed is in the high speed range.

4. The control device for a hydrostatic transmission vehicle recited in claim 1, wherein the vehicle speed limit setting section includes a table representing a relation between the vehicle speed limit and the pressure in the hydraulic circuit, the table sets a lower speed range of the vehicle speed limit as a pump range where the vehicle speed limit is set for controlling the displacement of the variable displacement pump, the table setting a higher speed range of the vehicle speed limit as a motor range where the vehicle speed limit is set for controlling the displacement of the variable displacement hydraulic motor, and the motor range allows the vehicle speed limit to be increased in proportion to reduction in the pressure.

5. The control device for a hydrostatic transmission vehicle recited in claim 1, wherein
the hydraulic sensor includes a front hydraulic sensor configured and arranged to detect the pressure in the hydraulic circuit in a forward travel and a rear hydraulic sensor configured and arranged to detect the pressure in the hydraulic circuit in a rearward travel,
the control device further comprises a travel lever sensor configured and arranged to detect a travel direction of the vehicle, and a differential pressure calculation section,
the differential pressure calculation section is configured to calculate a front-rear differential pressure either by subtracting a detection value of the rear hydraulic sensor from a detection value of the front hydraulic sensor in the forward travel or by subtracting the detection value of the front hydraulic sensor from the detection value of the rear hydraulic sensor in the rearward travel based on a result detected by the travel lever sensor, and
the vehicle speed limit setting section is configured to set the vehicle speed limit based on the front-rear differential pressure calculated by the differential pressure calculation section.

6. The control device for a hydrostatic transmission vehicle recited in claim 5, wherein
the vehicle includes a left travel unit and a right travel unit, the variable displacement pump includes a pump for driving the left travel unit and a pump for driving the a right travel unit, and the variable displacement hydraulic motor includes a motor for driving the left travel unit and a motor for driving the right travel unit,
the control device further comprises a steering lever sensor configured and arranged to detect a rightward/leftward steering stroke,
the differential pressure calculation section is configured to calculate a left front-rear differential pressure based on a detection value of the left front hydraulic sensor and a detection value of the left rear hydraulic sensor, to calculate a right front-rear differential pressure based on a detection value of the right front hydraulic sensor and a detection value of the right rear hydraulic sensor, and to calculate an average front-rear differential pressure by respectively weighting the left front-rear differential pressure and the right front-rear differential pressure with a result detected by the steering lever sensor and then averaging the weighted left front-rear differential pressure and the weighted right front-rear differential pressure, and
the vehicle speed limit setting section is configured to set the vehicle speed limit based on the average front-rear differential pressure calculated by the differential pressure calculation section.

7. The control device for a hydrostatic transmission vehicle recited in claim 1, further comprising
a hydraulic sensor configured and arranged to detect a pressure in a hydraulic circuit including the variable displacement pump and the variable displacement hydraulic motor,
a torque limit setting section configured to obtain the engine speed and set a torque limit usable for the hydrostatic transmission based on the obtained engine speed,
a torque control pump displacement setting section configured to set a torque control pump displacement based on the detected pressure in the hydraulic circuit and the torque limit set by the torque limit setting section,
a pump displacement selection section configured to select a smaller one of the pump displacement obtained through the control by the pump and motor displacement control section and the pump displacement set by the toque control pump displacement setting section and to output the selected one of the pump displacements as a pump displacement command value for controlling the variable displacement pump,
a PID control section configured to set the motor displacement for allowing the hydraulic pressure in the hydraulic circuit to be a preliminarily set target pressure by executing a PID control, and
a motor displacement selection section configured to select a larger one of the motor displacement obtained through the control by the pump and motor displacement control section and the motor displacement set by the PID control section and to output the selected one of the motor displacements as a motor displacement command value for controlling the variable displacement hydraulic motor.

8. The control device for a hydrostatic transmission vehicle recited in claim 7, wherein
the hydraulic sensor includes a front hydraulic sensor configured and arranged to detect the pressure in the hydraulic circuit in a forward travel and a rear hydraulic sensor configured and arranged to detect the pressure in the hydraulic circuit in a rearward travel,
the control device further comprises a travel lever sensor configured and arranged to detect a travel direction of the vehicle and a differential pressure calculation section,
the differential pressure calculation section is configured to calculate a front-rear differential pressure either by subtracting a detection value of the rear hydraulic sensor from a detection value of the front hydraulic sensor in the forward travel or by subtracting the detection value of the front hydraulic sensor from the detection value of the rear hydraulic sensor in the rearward travel based on a result detected by the travel lever sensor, and
each of the torque control pump displacement setting section and the PID control section is configured to set a corresponding one of the pump displacement and the motor displacement based on the front-rear differential pressure calculated by the differential pressure calculation section.

9. The control device for a hydrostatic transmission vehicle recited in claim 8, wherein
the vehicle includes a left travel unit and a right travel unit, the variable displacement pump includes a pump for driving the left travel unit and a pump for driving the right travel unit, and the variable displacement hydraulic motor includes a motor for driving the left travel unit and a motor for driving the right travel unit,
the control device further comprises a steering lever sensor configured and arranged to detect a rightward/leftward steering stroke,
the differential pressure calculation section is configured to calculate a left front-rear differential pressure based on a detection value of the left front hydraulic sensor and a detection value of the left rear hydraulic sensor, to calculate a right front-rear differential pressure based on a detection value of the right front hydraulic sensor and a detection value of the right rear hydraulic sensor, and to calculate an average front-rear differential pressure by respectively weighting the left front-rear differential pressure and the right front-rear differential pressure with a result detected by the steering lever sensor and averaging the weighted left front-rear differential pressure and the weighted right front-rear differential pressure, and each of the torque control pump displacement setting section and the PID control section is configured to set a corresponding one of the pump displacement and the motor displacement based on the front-rear differential pressure calculated by the differential pressure calculation section.

10. The control device for a hydrostatic transmission vehicle recited in claim 1, wherein the pump and motor displacement control section executes the control of the displacements of the variable displacement pump and the variable displacement motor regardless of a state of a fuel regulation device of the hydrostatic transmission vehicle that sets an engine speed of the engine.

11. A control device for a hydrostatic transmission vehicle equipped with a hydrostatic transmission including a variable displacement pump to be driven by an engine and a variable displacement hydraulic motor to be rotated by a pressurized oil from the variable displacement pump, the control device comprising:

a vehicle speed setting section configured to set a set vehicle speed based on both a travel command and a gear stage command instructed by an operator, the set vehicle speed being a maximum vehicle speed corresponding to the travel command and the gear stage command;

a low rotation matching engine speed setting section storing a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range, the low rotation matching engine speed setting section being configured to set the upper limit of the engine speed using the set vehicle speed set by the vehicle speed setting section based on the correspondence;

a pump and motor displacement control section preliminarily storing a correspondence of a displacement of the variable displacement pump with respect to the set vehicle speed and a correspondence of a displacement of the variable displacement hydraulic motor with respect to the set vehicle speed for allowing a vehicle speed to reach the set vehicle speed set by the vehicle speed setting section even when the engine is rotated at the partial engine speed, the pump and motor displacement control section being configured to control the respective displacements of the variable displacement pump and the variable displacement hydraulic motor based on the set vehicle speed set by the vehicle speed setting;

a hydraulic sensor configured and arranged to detect a pressure in a hydraulic circuit including the variable displacement pump and the variable displacement hydraulic motor, a torque limit setting section configured to obtain the engine speed and set a torque limit usable for the hydrostatic transmission based on the obtained engine speed, a vehicle speed limit setting section configured to set a vehicle speed limit based on the detected pressure in the hydraulic circuit and the torque limit set by the torque limit setting section, and a vehicle speed selection section configured to select a lower one of the set vehicle speed set by the vehicle speed setting section and the vehicle speed limit set by the vehicle speed limit setting section, the pump and motor displacement control section being configured to execute the control using the vehicle speed selected by the vehicle speed selection section as the set vehicle speed.

12. The control device for a hydrostatic transmission vehicle recited in claim 11, wherein the pump and motor displacement control section executes the control of the displacements of the variable displacement pump and the variable displacement motor regardless of a state of a fuel regulation device of the hydrostatic transmission vehicle that sets an engine speed of the engine.

13. A control device for a hydrostatic transmission vehicle equipped with a hydrostatic transmission including a variable displacement pump to be driven by an engine and a variable displacement hydraulic motor to be rotated by a pressurized oil from the variable displacement pump, the control device comprising:

a vehicle speed setting section configured to set a set vehicle speed based on both a travel command and a gear stage command instructed by an operator, the set vehicle speed being a maximum vehicle speed corresponding to the travel command and the gear stage command;

a low rotation matching engine speed setting section storing a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range, the low rotation matching engine speed setting section being configured to set the upper limit of the engine speed using the set vehicle speed set by the vehicle speed setting section based on the correspondence;

a pump and motor displacement control section preliminarily storing a correspondence of a displacement of the variable displacement pump with respect to the set vehicle speed and a correspondence of a displacement of the variable displacement hydraulic motor with respect to the set vehicle speed for allowing a vehicle speed to reach the set vehicle speed set by the vehicle speed setting section when the engine is rotated at the high idle engine speed, the pump and motor displacement control section being configured to respectively control the displacements of the variable displacement pump and the variable displacement hydraulic motor based on the set vehicle speed;

a set vehicle speed correction section configured to correct the set vehicle speed set by the vehicle speed setting section with the upper limit of the engine speed set by the low rotation matching engine speed setting section for allowing the vehicle speed to reach the set vehicle speed set by the vehicle speed setting section when the engine is rotated at the partial engine speed, the set vehicle speed correction section being configured to output the corrected set vehicle speed to the pump and motor displacement control section;

a hydraulic sensor configured and arranged to detect a pressure in a hydraulic circuit including the variable displacement pump and the variable displacement hydraulic motor, a torque limit setting section configured to obtain the engine speed and set a torque limit usable for the hydrostatic transmission based on the obtained engine speed, a vehicle speed limit setting section configured to set a vehicle speed limit based on the detected pressure in the hydraulic circuit and the torque limit set by the torque limit setting section, and a vehicle speed selection section configured to select a lower one of the set vehicle speed set by the vehicle speed setting section and the vehicle speed limit set by the vehicle speed limit setting section, the pump and motor displacement control section being configured to execute the control using the vehicle speed selected by the vehicle speed selection section as the set vehicle speed.

14. The control device for a hydrostatic transmission vehicle recited in claim 13, wherein the pump and motor displacement control section executes the control of the displacements of the variable displacement pump and the variable displacement motor regardless of a state of a fuel regulation device of the hydrostatic transmission vehicle that sets an engine speed of the engine.

15. A control device for a hydrostatic transmission vehicle equipped with a hydrostatic transmission including a variable displacement pump to be driven by an engine and a variable displacement hydraulic motor to be rotated by a pressurized oil from the variable displacement pump, the control device comprising:

a vehicle speed setting section configured to set a set vehicle speed based on both a travel command and a gear stage command instructed by an operator, the set vehicle speed being a maximum vehicle speed corresponding to the travel command and the gear stage command;

a low rotation matching engine speed setting section storing a correspondence of an upper limit of an engine speed with respect to the set vehicle speed for limiting the upper limit of the engine speed to a predetermined partial engine speed set to be lower than a high idle engine speed when the set vehicle speed is in a preliminarily set low and intermediate speed range, the low rotation matching engine speed setting section being configured to set a low rotation matching engine speed as the upper limit of the engine speed using the set vehicle speed set by the vehicle speed setting section based on the correspondence;

a set vehicle speed correction section configured to calculate a corrected set vehicle speed based on an equation "the corrected set vehicle speed =the set vehicle speed ×(the high idle engine speed / the low rotation matching engine speed)" using the set vehicle speed set by the vehicle speed setting section and the low rotation matching engine speed;

a pump and motor displacement control section preliminarily storing a correspondence of a displacement of the variable displacement pump with respect to the set vehicle speed and a correspondence of a displacement of the variable displacement hydraulic motor with respect to the set vehicle speed for allowing a vehicle speed to reach the set vehicle speed set by the vehicle speed setting section when the engine is rotated at the high idle engine speed, the pump and motor displacement control section being configured to control the respective displacements of the variable displacement pump and the variable displacement hydraulic motor based on the corrected set vehicle speed calculated by the set vehicle speed correction section;

a hydraulic sensor configured and arranged to detect a pressure in a hydraulic circuit including the variable displacement pump and the variable displacement hydraulic motor, a torque limit setting section configured to obtain the engine speed and set a torque limit usable for the hydrostatic transmission based on the obtained engine speed, a vehicle speed limit setting section configured to set a vehicle speed limit based on the detected pressure in the hydraulic circuit and the torque limit set by the torque limit setting section, and a vehicle speed selection section configured to select a lower one of the set vehicle speed set by the vehicle speed setting section and the vehicle speed limit set by the vehicle speed limit setting section, the pump and motor displacement control section being configured to execute the control using the vehicle speed selected by the vehicle speed selection section as the set vehicle speed.

16. The control device for a hydrostatic transmission vehicle recited in claim 15, wherein the pump and motor displacement control section executes the control of the displacements of the variable displacement pump and the variable displacement motor regardless of a state of a fuel regulation device of the hydrostatic transmission vehicle that sets an engine speed of the engine.

* * * * *